US011329872B2

(12) United States Patent
Lane et al.

(10) Patent No.: US 11,329,872 B2
(45) Date of Patent: May 10, 2022

(54) INDUSTRIAL INTERNET OF THINGS DEVICE PROVISIONING

(71) Applicant: Ubicquia LLC, Melbourne, FL (US)

(72) Inventors: Jonathan Scott Lane, Melbourne, FL (US); Joao Alberto Peterson De Faria, Melbourne, FL (US); Scott Latsa, Melbourne, FL (US); Matt Bossaers, Melbourne, FL (US)

(73) Assignee: Ubicquia, Inc., Fort Lauderdale, FL (US)

( * ) Notice: Subject to any disclaimer, the term of this patent is extended or adjusted under 35 U.S.C. 154(b) by 0 days.

(21) Appl. No.: 17/217,897

(22) Filed: Mar. 30, 2021

(65) Prior Publication Data

US 2021/0306214 A1   Sep. 30, 2021

Related U.S. Application Data

(60) Provisional application No. 63/002,178, filed on Mar. 30, 2020.

(51) Int. Cl.
| | |
|---|---|
| *H04L 12/24* | (2006.01) |
| *G16Y 30/00* | (2020.01) |
| *H04L 29/08* | (2006.01) |
| *H04L 41/0806* | (2022.01) |
| *H04L 67/02* | (2022.01) |

(52) U.S. Cl.
CPC .......... *H04L 41/0806* (2013.01); *G16Y 30/00* (2020.01); *H04L 67/02* (2013.01)

(58) Field of Classification Search
None
See application file for complete search history.

(56) References Cited

U.S. PATENT DOCUMENTS

| | | | | |
|---|---|---|---|---|
| 6,463,421 | B2 * | 10/2002 | Junger | G06Q 20/209 |
| | | | | 705/28 |
| 10,880,743 | B1 * | 12/2020 | Berzin | H04L 41/0806 |
| 11,132,636 | B2 * | 9/2021 | Arunachalam | H04W 4/70 |
| 11,133,984 | B2 * | 9/2021 | Newell | H04W 48/08 |

(Continued)

*Primary Examiner* — Backhean Tiv
(74) *Attorney, Agent, or Firm* — Daniel C. Crilly; Thomas J. Satagaj

(57) ABSTRACT

Provisioning industrial internet of things (IIOT) devices arranged for deployment in disparate geographic locations includes grouping a subset of IIOT devices into a batch. Each IIOT device stores a system-wide unique identifier (SWUI) and first communication information that identifies a global computing server. The method includes recording with a first input system the SWUI of each IIOT device in the batch, generating a batch identifier, associating the batch identifier with the batch of IIOT devices or each IIOT device in the batch, and associating the batch identifier with customer information. The customer information is associated with second communication information, which identifies a customer-based computing server. The method includes receiving, at the global computing server, incoming communications from a selected IIOT device, and based on the SWUI, and retrieving the batch identifier. Based on the batch identifier, second communication information identifying the customer-based computing server is transmitted to the selected IIOT device.

20 Claims, 6 Drawing Sheets

(56) References Cited

U.S. PATENT DOCUMENTS

| | | | | |
|---|---|---|---|---|
| 2016/0112262 | A1* | 4/2016 | Johnson | H04L 61/1511 |
| | | | | 709/221 |
| 2016/0379163 | A1* | 12/2016 | Johanson | G06Q 10/0833 |
| | | | | 705/333 |
| 2016/0379165 | A1* | 12/2016 | Moakley | G06Q 10/0833 |
| | | | | 705/333 |
| 2017/0201585 | A1* | 7/2017 | Doraiswamy | H04L 67/2804 |
| 2018/0103039 | A1* | 4/2018 | Thaler | H04L 41/0806 |
| 2018/0189731 | A1* | 7/2018 | Nossam | G06Q 10/083 |
| 2018/0232693 | A1* | 8/2018 | Gillen | G06Q 10/0833 |
| 2019/0306242 | A1* | 10/2019 | Thummalapalli | H04L 41/5003 |
| 2019/0349426 | A1* | 11/2019 | Smith | H04L 41/12 |
| 2020/0019927 | A1* | 1/2020 | Muirhead | G06Q 30/0645 |
| 2020/0097902 | A1* | 3/2020 | Anders | G06Q 10/0833 |
| 2020/0162556 | A1* | 5/2020 | Wood | G06Q 30/00 |
| 2020/0213193 | A1* | 7/2020 | Newell | H04L 41/04 |
| 2020/0280491 | A1* | 9/2020 | Riedl | H04L 41/0806 |
| 2020/0349510 | A1* | 11/2020 | Dhonde | G06K 19/06037 |
| 2020/0389301 | A1* | 12/2020 | Detres | H04L 9/0861 |
| 2021/0004759 | A1* | 1/2021 | Arunachalam | H04W 4/44 |
| 2021/0306214 | A1* | 9/2021 | Lane | G16Y 30/00 |
| 2021/0307146 | A1* | 9/2021 | Lane | H05B 47/165 |

* cited by examiner

INDUSTRIAL INTERNET OF THINGS DEVICE PROVISIONING

CROSS-REFERENCE TO RELATED APPLICATIONS

This application claims the priority benefit of U.S. Provisional Patent Application No. 63/002,178, filed Mar. 30, 2020. This application is hereby incorporated by reference in its entirety.

BACKGROUND

Technical Field

The present disclosure generally relates to Internet of Things (IOT) devices and Industrial Internet of Things (IIOT) devices. More particularly, but not exclusively, the present disclosure relates to provisioning IOT and IIOT devices for operation in the field.

Description of the Related Art

Internet of Things (IOT) and Industrial Internet of Things (IIOT) devices are fixed and/or mobile electronic computing devices that are coupled or coupleable to a computing network. IOT devices are often described as devices with consumer facing applicability and IIOT devices are often described as devices with industrial or machine-to-machine applicability. The two types of devices (i.e., IOT and IIOT devices) have one or more computing processors, memory storing instructions that direct operations of the one or more computing processors, and network circuitry. In many cases, the IOT and IIOT devices also include a power source (e.g., one or more of a battery, a physical power interface, a power supply, a photovoltaic cell, an induction coil, etc.), at least one sensor (e.g., accelerometer, thermometer, pressure sensor, etc.), and memory to store data collected by the device.

Rather than a general-purpose computing device, an IIOT device is typically arranged to perform a particular function or set of functions. An IIOT device may, for example, be arranged as an environmental sensor that collects data such as temperature, humidity, air quality, and the like. In these cases, the IIOT device is deployed in a city, rural area, or some other location, and the device is either programmed on site or at the factory to communicate with a specific remote computing server. The remote computing server may be arranged at a great distance (e.g., tens, hundreds, or even thousands of miles away) from the IIOT device. Alternatively, the remote computing server may be a smart phone, tablet, or other computing device permanently or transitorily arranged a short distance (e.g., tens or hundreds of feet or inches or some other distance) from the IIOT device. In these cases, the IIOT device is programmed to communicate data to, from, or to and from a specific remote computing server.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

The device, method, and system embodiments described in this disclosure (i.e., the teachings of this disclosure) enable Internet of Things (IOT) and Industrial Internet of Things (IIOT) devices to be factory-programmed, or otherwise pre-deployment programmed, with one or more network communication parameters. The network communication parameters identify a first, global remote computing server by, for example, the network identity of the remote computing server. When the IOT or IIOT device is deployed and powered, the device will first communicate with the global remote computing server. In this first communication, the IOT or IIOT device will include identification information that enables the global remote computing server to know which IOT or IIOT device is communicating.

After receiving the identification information, the global remote computing server will determine a customer to which the IOT or IIOT device is assigned, and the global remote computing server will reply with a secondary set of network communication parameters, which the IOT or IIOT device will store in its memory. The secondary set of network communication parameters permits the IOT or IIOT device to direct future communications to a secondary (e.g., local) computing server. The secondary computing server manages a network of IOT or IIOT devices.

In at least one example, a plurality of hundreds of IIOT devices are sold to a particular city. In this case, the IIOT devices are streetlight controllers, and each of the hundreds of streetlight controllers, along with thousands, tens of thousands, hundreds of thousands, or some other number of streetlight controllers are programmed at a factory with identical network communication parameters. When any of the hundreds, thousands, or millions of streetlight controllers are deployed, the streetlight controller will first communicate with a same global remote computing server. In this first communication, based on a system-wide unique identifier of the particular streetlight controller, the global remote computing server will determine which customer (e.g., city, power utility, department of transportation, or the like) the streetlight controller belongs to. Next, the global remote computing server will return a network address of a customer-based computing server that the streetlight controller should communicate with. In the example, this process is carried out by the city's hundreds of streetlight controllers, and each of those streetlight controllers will reprogram itself with the new network address. In this way, the city's customer-based computing server will be able to manage the hundreds of streetlight controllers, for example, by displaying a map, overlaying a location of each streetlight controller on the map, and populating the map or other such content with information about each streetlight or its associated streetlight controller.

In a first embodiment, a method to provision a plurality of industrial internet of things (IIOT) devices includes: grouping a subset of the plurality of IIOT devices into a batch of IIOT devices, the plurality of IIOT devices arranged for deployment in disparate geographic locations, each of the plurality of IIOT devices having stored therein a system-wide unique identifier (SWUI) and first communication information identifying a certain global computing server; recording with a first input system the SWUI of each IIOT device in the batch; generating a batch identifier; associating the generated batch identifier with either or both of the batch of IIOT devices and each IIOT device in the batch of IIOT devices; associating the generated batch identifier with customer information, the customer information being associated with second communication information that identifies a customer-based computing server; receiving, at the certain global computing server, incoming communications from a selected IIOT device of the batch of IIOT devices, the incoming communications including the SWUI of the selected IIOT device; based on the SWUI, retrieving the batch identifier; and based on the batch identifier, transmitting second communication information that identifies the customer-based computing server to the selected IIOT device.

In some cases of the first embodiment, the method also includes receiving, at the certain customer-based computing server, communications from the selected IIOT device; and based on the communications from the selected IIOT device, producing information for a network-based display of geographic information. In some cases, the method includes generating, with a web server, at least one web page arranged to present a map and at least one icon presented on the map, the at least one icon presented on the map representing a geographic location of the selected IIOT device. Sometimes, at least some of the plurality of IIOT devices are smart streetlight controllers. Sometimes, at least some of the plurality of IIOT devices are transformer-monitor devices or small cell telecommunications devices. And sometimes, at least some of the plurality of IIOT devices are arranged to communicate via a cellular communications network. In these or other cases of the first embodiment, the SWUI includes at least a portion of a cellular chipset identifier. At times, the certain global computing server is any one of a plurality of certain customer-based computing servers.

In some cases of the first embodiment, the batch of IIOT devices are co-located in a single shipping package prior to shipment to a customer, and a representation of the batch identifier is a machine-readable structure affixed to the single shipping package. Each batch identifier may be electronically associated with a purchase order. Each batch identifier may identify a shippable package of IIOT devices. And in at least some cases, the customer-based computing server is arranged to present at least one web page, the at least one web page presenting a map and at least one icon, the at least one icon representing a geographic location of the selected IIOT device.

In a second embodiment, a system to provision a plurality of industrial internet of things (IIOT) devices includes: a first input system to record a system-wide unique identifier (SWUI) of each IIOT device of a plurality of IIOT devices, the plurality of IIOT devices configured for deployment in disparate geographic locations, each of the plurality of IIOT devices having stored therein the SWUI and first communication information that identifies a certain global computing server; a second input system to associate a batch identifier with a batch of IIOT devices and to further associate the batch identifier with the SWUI of each IIOT device in the batch of IIOT devices, said batch of IIOT devices being a subset of the plurality of IIOT device; the certain global computing server is arranged to: receive incoming communications from a selected IIOT device of the batch of IIOT devices; based on the SWUI, retrieve the batch identifier associated with the selected IIOT device; and based on the batch identifier, transmit, to the selected IIOT device, second communication information that identifies a certain customer-based computing server; and the certain customer-based computing server is arranged to: receive communications from the selected IIOT device; and produce information for a network-based display of geographic information.

In some cases of the second embodiment, the first input system and the second input system include at least one of a barcode reader, a quick response (QR) code reader, or a radio frequency identifier (RFID) reader. In some cases, at least some of the plurality of IIOT devices are smart streetlight controllers, transformer-monitor devices, or small cell telecommunications devices.

In some cases of the second embodiment, at least some of the plurality of IIOT devices are arranged to communicate via a cellular communications network. Sometimes, the certain global computing server and the certain customer-based computing server are different computing servers. And sometimes, each location of the disparate geographic locations is a different streetlight luminaire.

In a third embodiment, a method includes: retrieving at a first computing server a separate and distinct system-wide unique ID (SWUI) for each of N industrial internet of things (IIOT) devices, wherein N is a first integer greater than zero; generating at the first computing server a shipment code that includes information sufficient to determine each of the N separate and distinct SWUI's; joining a representation of the shipment code to a shippable package, the shippable package containing the N IIOT devices; receiving at a second computing server a purchase order; assigning at the second computing server a unique purchase order code to the purchase order; associating at the second computing server SWUI's of M shippable packages with the unique purchase order code, wherein M is a second integer greater than zero; storing by the second computing server the associated SWUI's and unique purchase order code in a repository; receiving at a third computing server a certain SWUI via a network connection; and pointing an IIOT device associated with the certain SWUI to a fourth computing server based on the certain SWUI. In some cases of the third embodiment, all of the first, second, third, and fourth computing servers are different computing servers.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
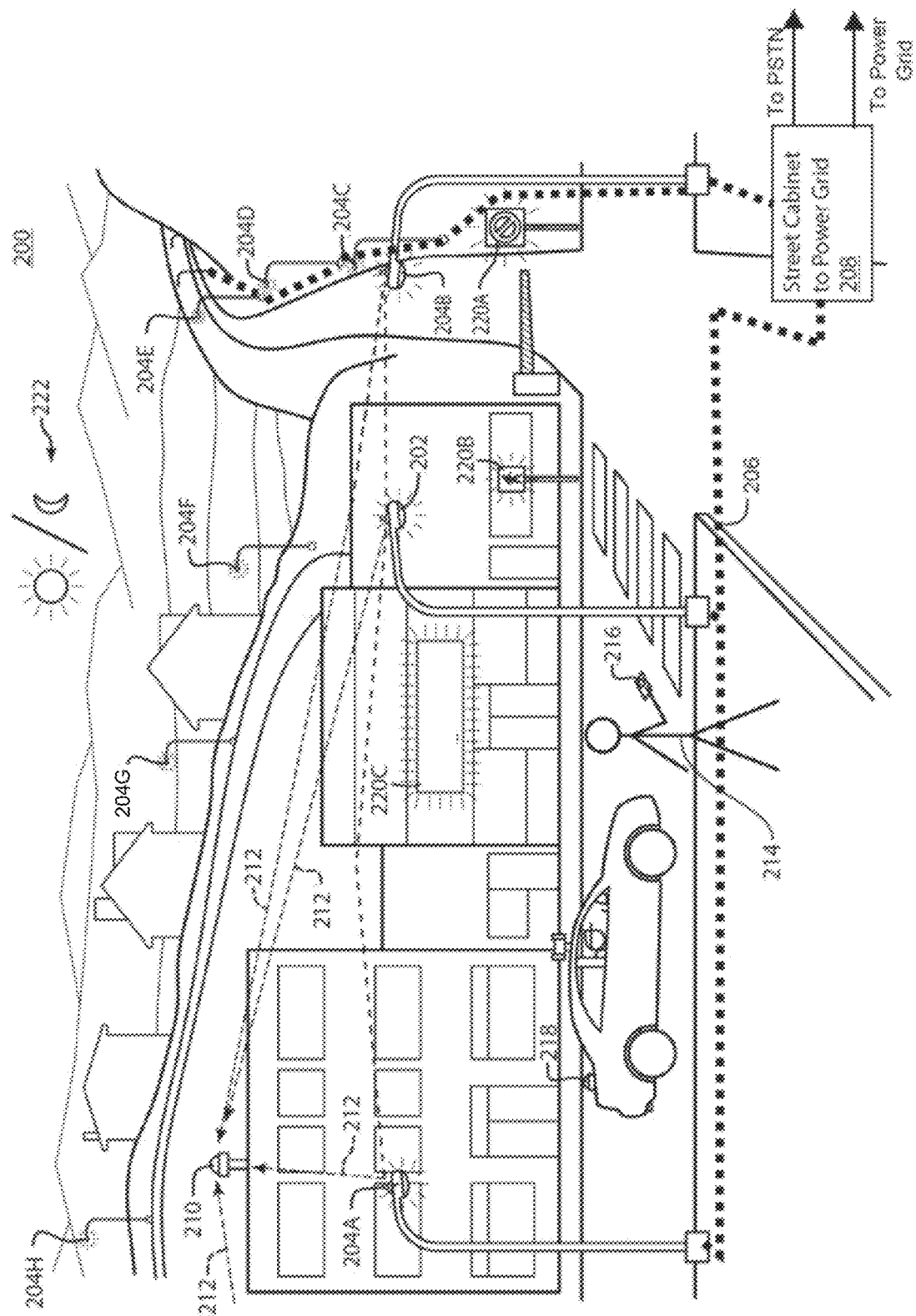
FIG. 1 is a system level deployment having a plurality IIOT device embodiments.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined herein, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

Internet of Things (IOT) and Industrial Internet of Things (IIOT) devices are fixed and/or mobile electronic computing devices that are coupled or coupleable to a computing network. IOT devices are often described as devices with consumer facing applicability and IIOT devices are often described as devices with industrial, or machine-to-machine, applicability. The two types of devices (i.e., IOT and IIOT devices), and other like devices, have one or more computing processors, memory storing instructions that direct operations of the one or more computing processors, and network circuitry. In many cases, the IOT and IIOT devices also include a power source (e.g., one or more of a battery, a physical power interface, a power supply, a photovoltaic cell, an induction coil, etc.), at least one sensor (e.g., accelerometer, thermometer, pressure sensor, etc.), and memory to store data collected by the device.

To avoid confusing or obfuscating the inventive subject matter disclosed herein, the present disclosure will predominantly describe system, method, and device embodiments in the context of one or more IIOT devices. Nevertheless, one of skill in the art will recognize that the principles described herein are not so limited, and such principles may be equally applicable to IOT devices, specialized computing devices, smart devices, smart home devices, mobile computing devices, wearable devices, and other like devices. Accordingly, unless expressly described otherwise, or unless the context demands otherwise, each use of the term "IIOT" may be interchangeably replaced with the terms, "IOT," "smart," or any other suitable term.

Rather than a general-purpose computing device, an IIOT device is typically arranged to perform a particular function or set of functions. An IIOT device may, for example, be arranged as an environmental sensor that collects data such as temperature, humidity, air quality, and the like. In these cases, the IIOT device is deployed in a city, rural area, or some other location, and the device is either programmed on site or at the factory to communicate with a specific local or remote computing server. The local or remote computing server may be arranged at a great distance (e.g., tens, hundreds, or even thousands of miles away) from the IIOT device. Alternatively, the local or remote computing server may be a smart phone tablet, or other computing device permanently or transitorily arranged a short distance (e.g., tens or hundreds of feet or inches or some other distance) from the IIOT device. In these cases, the IIOT device is programmed to communicate data to, from, or to and from a specific local or remote computing server.

As described herein, programming a specific IIOT device to communicate with a specific computing server is conventional IIOT device provisioning. The provisioning may be performed at a factory, at a different site, or even when the conventional IIOT device has been deployed. Conventional IIOT device provisioning may include programming specific network communication parameters into the conventional IIOT device. In any such case, the conventional IIOT device is directly targeted and configured to communicate with a specific target computing device.

Rather than conventional provisioning, embodiments of the inventive subject matter disclosed herein describe new systems, methods, and devices (i.e., the teachings of this disclosure) for provisioning IIOT devices in a new way. In this teaching, any suitable number of IIOT devices are identically configured with identical network communication parameters at a time of manufacture, at a time of complete reset, at a time of first provisioning, or at any other time. This provisioning of a common default state promotes improved efficiency in the manufacture and deployment of IIOT devices.

Subsequently, when any one of the IIOT devices is deployed, then that IIOT device will begin to communicate in accordance with its default network communication parameters. The default network communication parameters direct the IIOT device to communicate with a certain computing server such as a global computing server. The certain computing server that receives this initial communication will identify a new target computing device (e.g., a local computing server, customer-based computing server, a remote computing server, or the like) that the IIOT device should be programmed to communicate with, and upon making such identification, the certain computing server receiving the initial communication will reply to the IIOT device by communicating new or otherwise updated network communication parameters. The new network communication parameters, which identify a target computing device, are stored by the IIOT device in the IIOT device's memory. From then on, the IIOT device will use the new or otherwise updated network communication parameter information to communicate with the target computing device. Accordingly, the teaching of the present disclosure of a new IIOT provisioning paradigm improves the functionality of each IIOT device by permitting a default set of parameters common to a plurality of IIOT devices, an unrestricted deployment of each IIOT device, and an automatic final provisioning of each respective IIOT device.

The network communication parameters of the present disclosure may alternatively or additionally include any zero or more of a fully qualified domain name (FQDN), a partially qualified domain name, a computing server identity, one or more protocol identifiers, a communication schedule, a communication frequency, a type of data requested, a type of data sent, and the like.

For the sake of convenience and not limitation, many of the IIOT device embodiments described in the present disclosure are directed toward IIOT devices implemented as smart streetlight controllers. Smart streetlight controllers are generally coupled to a respective streetlight luminaire via a standardized powerline interface. The standardized powerline interface defines a limited number of electrical/communicative conduits over which signals may be passed in-to or out-from the streetlight controller. In some cases, as will be discussed herein, the interface may be referred to as a NEMA interface, a NEMA socket, an ANSI C136 interface, or the like.

A known NEMA interface implements the powerline interface with connectors and receptacles that include seven electrical/communicative conduits (e.g., pins, blades, springs, connectors, receptacles, sockets, and other like "contacts"). A set of three primary contacts carry a Line voltage signal, a Load voltage signal, and a Neutral voltage signal. A set of four secondary contacts may be used by the streetlight controller to pass power, control information, status information, and the like. The four secondary contacts may be treated as a first pair of secondary contacts and a second pair of secondary contacts.

FIG. 1 is a system level deployment 200 having a plurality of IIOT device embodiments. At least one IIOT device is implemented as a small cell networking device and a plurality of IIOT devices are implemented as smart sensor devices coupled to streetlight fixtures. The smart sensor devices are in many, but not all, cases implemented as smart streetlight controllers. Each of the plurality of smart sensor devices includes the inventive IIOT provisioning technology described in the present disclosure. The small cell networking device, traffic lights, public information signs, private entity signs, and the like may also include IIOT provisioning technology of the type described here.

Streetlight fixtures in FIG. 1 are coupled to, or otherwise arranged as part of, a system of streetlight poles, and each streetlight fixture includes a light source. Each light source, light fixture, and light fitting, individually or along with their related components, may in some cases be interchangeably referred to as a luminaire, a light source, a streetlight, a streetlamp, or some other such suitable term. In the system level deployment 200, at least one light pole includes a fixture with a small cell networking device 202, and a plurality of light poles each have a smart sensor IIOT device 204A-204H. In the present disclosure, light poles having a smart sensor IIOT device 204A-204H may individually or collectively be referred to as light poles having a smart sensor IIOT device 204 or simply light poles 204 for brevity. In these cases, and for the purposes of the present disclosure, the light sensor of each light pole 204 may be structurally and operatively identical (i.e., having same or substantially similar circuitry and embedded software, and differing by way of one or more network-level system identifiers).

As shown in the system level deployment 200, a plurality of light poles 202, 204 are arranged in one or more determined geographic areas, and each light pole 202, 204 has at least one light source positioned in a fixture. The fixture is at least twenty feet above ground level and in at least some cases, the fixtures are between about 20 feet and 40 feet above ground level. In other cases, the streetlight fixtures may of course be lower than 20 feet above the ground or higher than 40 feet above the ground. In other system level deployments according to the present disclosure, there may be 1,000 or more light poles 202, 204 arranged in one or more determined geographic areas. In these or in still other cases, the streetlight fixtures may of course be lower than 20 feet above the ground or higher than 40 feet above the ground. Although described as being above the ground, streetlight fixtures shown and contemplated in the present disclosure may also be subterranean, but positioned above the floor, such as in a tunnel.

The system of streetlight poles, streetlight fixtures, streetlight sources, or the like in the system level deployment may be controlled by a municipality or other government agency. In other cases, the system streetlight poles, streetlight fixtures, streetlight sources, or the like in the system level deployment is controlled by a private entity (e.g., private property owner, third-party service contractor, or the like). In still other cases, a plurality of entities share control of the system of streetlight poles, streetlight fixtures, streetlight sources, or the like. The shared control may be hierarchical or cooperative in some other fashion. For example, when the system is controlled by a municipality or a department of transportation, an emergency services agency (e.g., law enforcement, medical services, fire services) may be able to request or otherwise take control of the system. In still other cases, one or more sub-parts of the system of streetlight poles, streetlight fixtures, streetlight sources, or the like can be granted some control such as in a neighborhood, around a hospital or fire department, in a construction area, or in some other manner.

In the system level deployment 200 of FIG. 1, any number of streetlight poles 202, 204 and their associated fixtures may be arranged with a connector that is compliant with a roadway area lighting standard promoted by a standards body such as ANSI C136.41 (e.g., a NEMA-based connector/socket system). The connector permits the controlling or servicing authority of the system to competitively and efficiently purchase and install light sensors on each streetlight fixture. In addition, or in the alternative, the standardized connector in each streetlight fixture permits the controlling or servicing authority to replace conventional light sensors with other devices such as a small cell networking device, a smart sensor IIOT device 120 FIG. 4, or some other IIOT device.

In the system level deployment 200, a small cell networking device is electromechanically coupled to a selected light pole 202 wherein the electromechanical coupling is performed via the connector that is compliant with the roadway area lighting standard promoted by a standards body. Stated differently, the system level deployment 200 includes at least one light pole and fixture with a small cell networking device 202, and a plurality of light poles each having a smart sensor IIOT device 204A-204H. In these light poles 204, each streetlight fixture is equipped with a standalone IIOT device, such as the smart sensor device 120 of FIGS. 2-5, that is electromechanically coupled via a respective connector compliant with the roadway area lighting standard promoted by the standards body. In this arrangement, each streetlight 202, 204 is equipped with a light sensor circuit that is further electrically coupled to a processor-based light control circuit. In at least some of these embodiments, electrically coupling the light sensor to the processor-based light control circuit includes passing a signal representing an amount of light detected by the light sensor to the processor-based light control circuit. In at least some of these embodiments, the light sensor is arranged to detect an amount of lux, lumens, or other measurement of luminous flux and generate the signal representing the amount of light detected.

The processor-based light control circuit of each IIOT device is arranged to provide a light control signal to the respective light source based on at least one ambient light signal generated by a light sensor associated with the processor-based light control circuit. In addition, because each streetlight 202, 204 is equipped with communication capabilities, each light source in each streetlight 202, 204 can be controlled remotely as an independent light source or in combination with other light sources. In at least some of these cases, each of the plurality of light poles and fixtures with a smart sensor IIOT device 204 is communicatively coupled to the light pole and fixture with a small cell networking device 202. The communicative relationship from each of the plurality of light poles and fixtures with a smart sensor IIOT device 204 to the light pole and fixture with a small cell networking device 202 may be a direct communication or an indirect communication. That is, in some cases, one of the plurality of light poles and fixtures with a smart sensor IIOT device 204 may communicate directly to the light pole and fixture with a small cell networking device 202 or the one of the plurality of light poles and fixtures with a smart sensor IIOT device 204 may communicate via one or more other ones of the plurality of light poles and fixtures with a smart sensor IIOT device 204 or via some other means (e.g., via a cellular communication to a traditional cellular macro-cell, via a wired connection, or the like).

In the system level deployment 200 of FIG. 1, various ones of the light poles may be 50 feet apart, 100 feet apart, 250 feet apart, or some other distance. In some cases, the type and performance characteristics of each small cell networking device and each smart sensor device 120 are selected based on their respective distance to other such devices such that wireless communications are acceptable.

The light pole and fixture with a small cell networking device 202 and each light pole and fixture with a smart sensor IIOT device 204 may be directly or indirectly coupled to a street cabinet 208 or other like structure that provides utility power (e.g., "the power grid") in a wired way. The utility power may provide 120 VAC, 208 VAC, 220 VAC, 240 VAC, 260 VAC, 277 VAC, 360 VAC, 415 VAC, 480 VAC, 600 VAC, or some other power source voltage. In addition, the light pole and fixture with a small cell networking device 202, and optionally one or more of the light poles and fixtures with smart sensor devices 204A-204H, are also coupled to the same street cabinet 208 or another structure via a wired backhaul connection. It is understood that these wired connections are in some cases separate wired connections (e.g., copper wire, fiber optic cable, industrial Ethernet cable, or the like) and in some cases combined wired connections (e.g., power over Ethernet (PoE), powerline communications (PLC), or the like). For simplification of the system level deployment 200 of FIG. 1, the wired backhaul and power line 206 is illustrated as a single line. In the embodiment of FIG. 1, the street cabinet 208 is coupled to the power grid, which is administered by a licensed power utility agency, and the street cabinet 208 is coupled to the public switched telephone network (PSTN). In other embodiments, the street cabinet 208 may be electrically, communicatively, or electrically and communicatively to some other infrastructure (e.g., power source, satellite communication network, or the like) such as a windmill, generator, solar source, fuel cell, satellite dish, long- or short-wave transceiver, or the like.

In some embodiments, any number of small cell networking devices 202 and smart sensor devices 204 are arranged to provide utility grade power metering functions. The utility grade power metering functions may be performed with a circuit arranged apply any one or more of a full load, a partial load, and a load where voltage and current are out of phase (e.g., 60 degrees; 0.5 power factor). Other metering methodologies are also contemplated.

Each light pole and fixture with a smart sensor IIOT device 204 is in direct or indirect wireless communication with the light pole and fixture that has the small cell networking device 202. In addition, each light pole and fixture with a smart sensor IIOT device 204 and the light pole and fixture with the small cell networking device 202 may also be in direct or indirect wireless communication 212 with an optional remote computing device 210. The remote computing device 210, when it is included in the system level deployment 200, may be controlled by a mobile network operator (MNO), a municipality, another government agency, a third party, or some other entity. By this optional arrangement, the remote computing device 210 can be arranged to wirelessly communicate light control signals and any other information (e.g., packetized data) between itself and each respective wireless networking device coupled to any of the plurality of light poles. A user 214 holding a mobile device 216 is represented in the system level deployment 200 of FIG. 1. A vehicle having an in-vehicle mobile device 218 is also represented. The vehicle may be an emergency service vehicle, a passenger vehicle, a commercial vehicle, a public transportation vehicle, a drone, or some other type of vehicle. The user 214 may use their mobile device 216 to establish a wireless communication session over a cellular-based network controlled by an MNO, wherein packetized wireless data is passed through the light pole and fixture with a small cell networking device 202. Concurrently, the in-vehicle mobile device 218 may also establish a wireless communication session over the same or a different cellular-based network controlled by the same or a different MNO, wherein packetized wireless data of the second session is also passed through the light pole and fixture with a small cell networking device 202.

Other devices may also communicate through light pole-based devices of the system level deployment 200. These devices may be IOT devices, IIOT devices, or some other types of smart devices. In FIG. 1, two public information signs 220A, 220B, and a private entity sign 220C are shown, but many other types of devices are contemplated. Each one of these devices may form an unlicensed wireless communication session (e.g., WiFi) or a cellular-based wireless communication session with one or more wireless networks made available by the devices shown in the system level deployment 200 of FIG. 1. The sun and moon 222 are shown in FIG. 1. Light or the absence of light based on time of day, weather, geography, or other causes provide information (e.g., ambient light) to the light sensors of the light pole mounted devices described in the present disclosure. Based on this information, the associated light sources may be suitably controlled.

Figure 2:
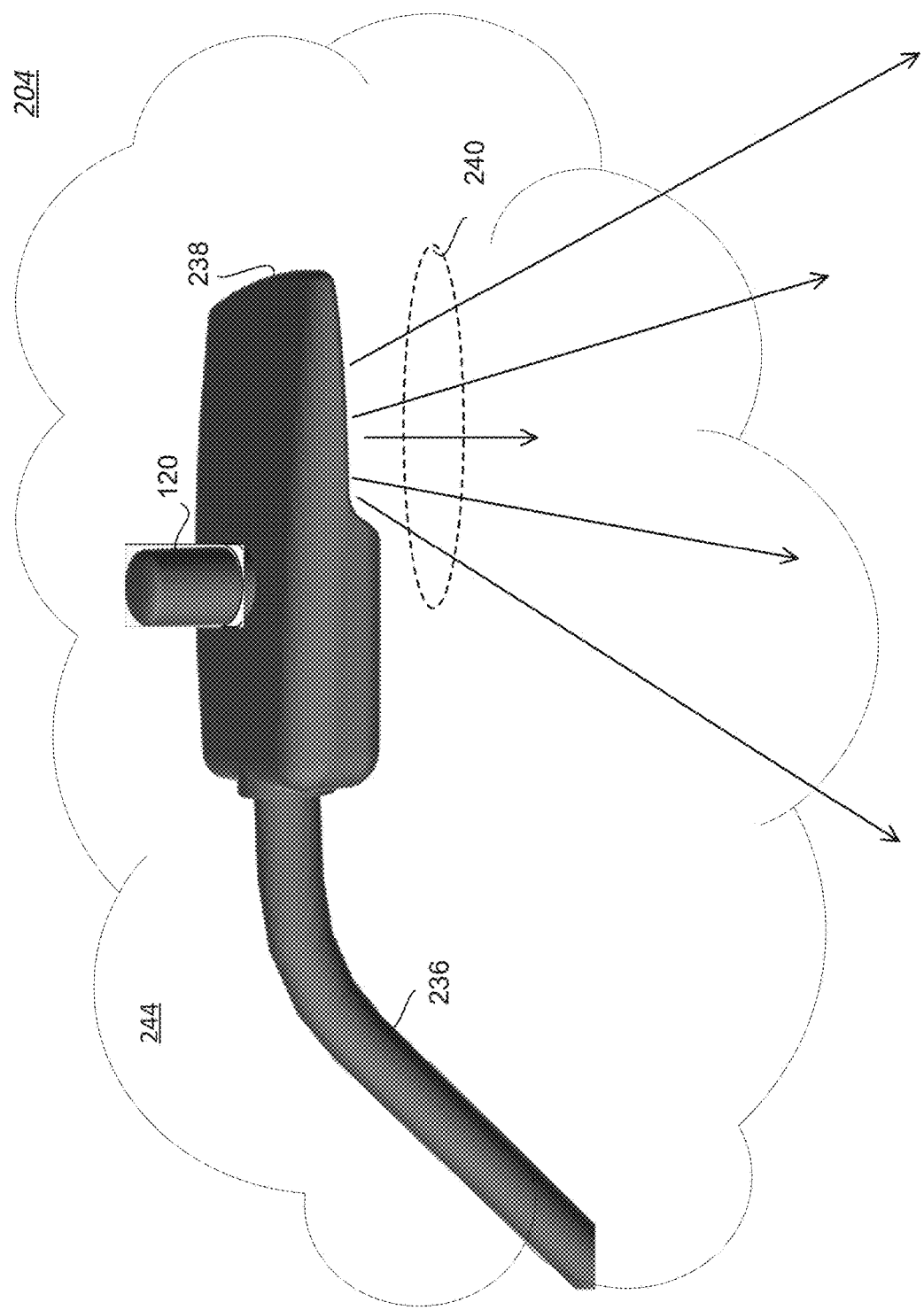
FIG. 2 is portion of a light pole and fixture with a smart sensor IIOT device.

FIG. 2 is portion of a streetlight pole and luminaire fixture with a smart sensor IIOT device 204. A streetlight support structure 236 (e.g., a pole) supports the luminaire 238. The luminaire 238 has a top-side connector (e.g., a socket) that is compliant with a roadway area lighting standard promoted by a standards body such as ANSI C136.41 (e.g., a NEMA-based connector/socket system). A smart sensor IIOT device 120 includes a corresponding connector (e.g., a set of "pins") at its base, which permits electro-mechanical coupling of the smart sensor IIOT device 120 to the luminaire 238.

The smart sensor IIOT device 120 in FIG. 2 is configured as a streetlight controller. The smart sensor IIOT device 120 has support circuitry including a power supply, a controller arranged to direct a volume of light 240 output from the luminaire 238 associated with the IIOT device 120 (e.g., a pulse width modulation (PWM) controller, a light emitting diode (LED) driver, dimming circuit, ballast, and the like), and certain switching and control circuits, which are further described in the present disclosure.

In some cases, the smart sensor IIOT device 120 is configured to capture data regarding any type of condition to be sensed 244 in proximity of the streetlight or streetlight pole where the smart sensor IIOT device 120 is deployed. Based on any such condition, the volume of light 240 may be adjusted. In at least some cases, the IIOT device 120 is configured to report any number of sensed conditions to a customer-based computing server. In these cases, the customer-based computing server may collect information about the streetlight, the area proximal to the streetlight, the status of the luminaire 128, the status of the light source, or any other data. Prior to the IIOT device 120 communicating with the customer-based computing server, however, the IIOT device must be re-configured from its initial-default state, which was programmed at the factory. In the initial default state, the IIOT device 120 is configured to communicate with a global computing server, and once automatically updated, the IIOT device 120 is arranged to communicate with the customer-based computing server.

Figure 3:
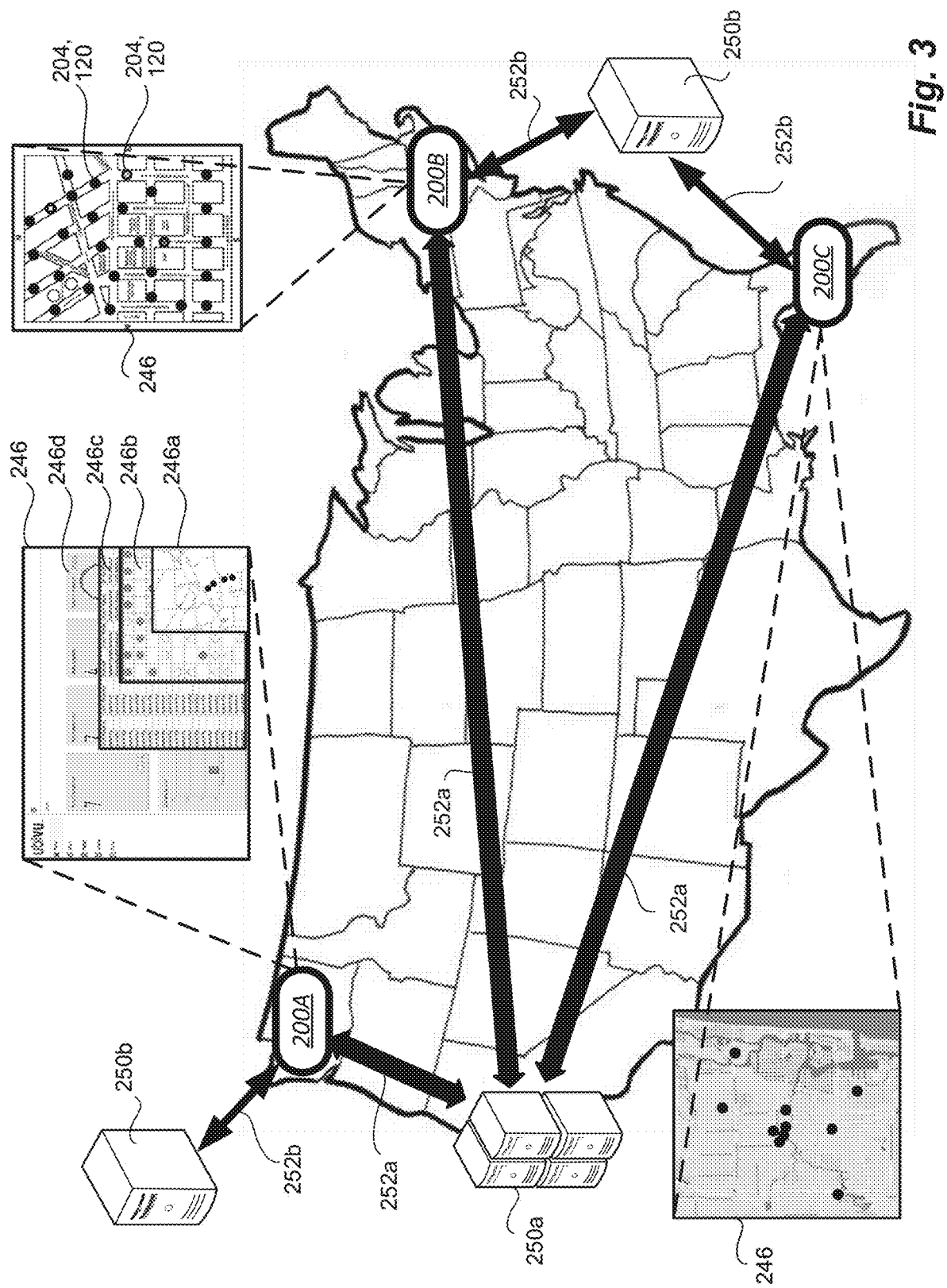
FIG. 3 is a plurality of separate and distinct system level deployments, each deployment having a plurality IIOT device embodiments implemented as smart streetlight controllers.

FIG. 3 is a plurality of separate and distinct system level deployments 200A, 200B, 200C, each deployment having a plurality IIOT device embodiments implemented as smart streetlight controllers. Various portions of the continental United States are represented in FIG. 3, but any other larger or smaller geographic region may alternatively have been represented.

The first deployment 200A represents a first batch of IIOT devices deployed in Seattle, Wash.; the second deployment 200B represents a second batch of IIOT devices deployed in Schenectady, N.Y.; and the third deployment 200C represents a third batch of IIOT devices deployed in Fort Lauderdale, Fla. Any other number of deployments, and any other number of cities, towns, regions, municipalities, power-utility districts, highway or roadway districts, or the like could also have been represented. Additionally, or in the alternative, any particular deployment may include one or more batches of IIOT devices, and each batch, as contemplated herein, may include any suitable number of one or more IIOT devices. In some cases, for example, a deployment may include 5 IIOT devices, 5 dozen IIOT devices, 500 IOT devices, 5,000 IIOT devices, 50,000 IIOT devices, or any other number of IIOT devices. One non-limiting way of considering a deployment of IIOT devices is as a "network" of IIOT devices that share common characteristics and that may be controlled or otherwise managed through a common interface (e.g., an interface or "console" realized as a website administered by a particular computing server).

In each of the three city-wide deployments 200A, 200B, 200C in FIG. 3, an enlarged view of a management console window 246 is shown. The management console is implemented via a customer-based computing server 250b after any number of the IIOT devices have been deployed. Two post-provisioning customer-based computing servers 250b are represented in FIG. 3, however, it is recognized that more, fewer, or any suitable number of customer-based computing servers 250b may be implemented once IIOT devices have been deployed and have been reprogrammed from an initial default state to a normal operating state.

As shown in each console window 246 (i.e., one console window 246 for each of deployments 200A, 200B, 200C, however, two or more console windows 246 per deployment are also contemplated), a map is represented. The map covers a particular geographic area associated with the system level deployment. For example, the console window 246 associated with Seattle includes a map of Seattle; the console window 246 associated with Schenectady includes a map of Schenectady, and the console window 246 associated with Fort Lauderdale includes a map of Fort Lauderdale. While the presentation in FIG. 3 is a fixed snapshot, it is recognized that in operation the respective map may be enlarged, shrunk, cropped, expanded, or manipulated in the usual way.

On each map, as represented through console window 246, an icon for each IIOT (e.g., each streetlight, each streetlight controller, each sensor, or the like) is overlaid. The icon identifies to a user of the console a physical location of each IIOT device, and therefore the structure that each IIOT device is associated with, along with other useful information. The user may retrieve any suitable amount of information, and in at least some cases, the user may control, direct, or otherwise interact with any of the selected IIOT devices one-on-one, as a group, as a sub-group, as a whole, or in any suitable way.

Turning back to FIG. 3, the representative icons are presented as dark circles overlaid on a map. Two particular icons (i.e., circles) in the console window 246 associated with the second deployment 200B of Schenectady, N.Y., are identified as light pole fixtures with smart sensor IIOT devices 204. These light pole fixtures with smart sensor IIOT devices 204 are along the lines of public infrastructure devices (i.e., a light pole 236, luminaire 238, and smart sensor IIOT device 120) presented in FIGS. 1 and 2 and described in associated with FIGS. 1 and 2. It is understood that only two light pole fixtures with smart sensor IIOT devices 204 are identified in FIG. 3 so as to avoid unnecessarily cluttering the figure. Nevertheless, one of skill in the art will recognize that in an actual console deployment, each and every light pole fixture with a smart sensor IIOT device 204 will be represented. Furthermore, for the purposes of the present disclosure, which is directed towards teaching IIOT device provisioning, the subsequent discussion associated with FIG. 3 and beyond, will be directed toward operations with, by, and for smart sensor IIOT devices 120.

In the console window 246 associated with the second deployment 200B of Schenectady, N.Y., a first one of the identified smart sensor IIOT devices 120 is shown as a solid, filled circle, and a second one of the identified smart sensor IIOT devices 120 is shown as a circle with a shaded center portion. Such representation is not limiting, but instead provides disclosure that suitable icons representing smart sensor IIOT devices 120 on a map may be shaped, colored, animated, sized, or adorned in one or plural ways to convey information to a user of the console window 246.

The console management window 246 is an interface to a web-based analysis and management tool. The web-based analysis and management tool may be implemented in a single device such as a computing server. Alternatively, the web-based analysis and management tool may be implemented in a network-accessible global computing server, a cloud-based server, or some other computing device. In the embodiments of FIG. 3, the web-based analysis and management tool is implemented via a customer-based computing server 250b.

For the sake of description and not limitation, the web-based analysis and management tool associated with the system level deployment 200A in Seattle presents four particular web pages, 246a, 246b, 246c, 246d. Each of the web pages 246a-d is optional. More, fewer, and other web pages may also be formed. The first web page 246a includes the map of Seattle on which a plurality of icons are represented. As discussed herein, the icons in the first web page 246a do not include reference numbers to avoid obfuscating the subject matter disclosed. Additionally, on the first web page 246a, only four icons are shown. One of skill in the art will recognize, however, that the city of Seattle may deploy fewer than four smart sensor IIOT devices 120, or the city of Seattle may deploy more than four smart sensor IIOT devices 120 (e.g., dozens, hundreds, or thousands of smart sensor IIOT devices 120).

A second web page 246b represents a matrix of information associated with a plurality of smart sensor IIOT devices 120 deployed in Seattle. The matrix may provide information such as the time of day that a particular streetlight turned on, a time of day that a particular streetlight turned off, a fault condition, a maintenance condition, a current status of a streetlight condition, or any other suitable information. The information in the matrix may be presented in any suitable format, size, font, color, graphic, multimedia, and the like.

A third web page 246c represents network parameter information associated with the system level deployment 200A. The network parameter information may include uniform resource locator (URL) information, electronic mail (email) information, system-wide unique identifier (SWUI) information for each smart sensor IIOT device 120 (e.g., a machine access code (MAC) address, an International Mobile Equipment Identity (IMEI) number, an electronic serial number (ESN), and the like), or any other suitable network parameter information.

A fourth web page 246d represents a dashboard that provides a user with a summarized view of the IIOT device network of the city of Seattle. That is, by viewing the fourth web page 246d, a viewer of the console window 246 may quickly know which streetlights in the city are on, which streetlights are off, which streetlights, if any, require maintenance, and any other such information. In addition, from the fourth web page 246d, the user may also direct control information to any of the particular smart sensor IIOT devices 120. By implementing the web-based analysis and management tool, a user is able to reduce maintenance costs, improve maintenance efficiency, provide energy savings, and provide direct control of any of the city's dozens, hundreds, or even thousands of streetlights. Many other implementations are also contemplated, particularly because the teaching of the present disclosure is not limited to smart sensor IIOT devices embodied only as streetlight controllers. Instead, the smart sensor IIOT devices of the present disclosure may be, or otherwise include, air quality sensors, particulate sensors, toxin sensors, humidity sensors, temperature sensors, carbon monoxide sensors, carbon dioxide sensors, wind sensors, light sensors, LED drivers, light group controllers, light-ballast devices, cameras, wireless network infrastructure (e.g., small cells, public WIFI, personal area network (PAN), local area network (LAN), beaconing, and the like), smart vehicle support service devices, first responder support service devices, and many other types of IIOT devices.

Two different types of communication paths are represented in the system level embodiments 200A, 200B, 200C of FIG. 3. A first type of provisioning communication 252a occurs between each smart sensor IIOT device 120 and a certain global computing server 250a. The first type of provisioning communication 252 takes place after a smart sensor IIOT device 120 is factory-programmed, or otherwise reset, to an initial default operating state with a first set of communication information (e.g., network communication parameters that identify a certain global computing server 250a). The smart sensor IIOT device 120 is deployed in the field, and upon first power up, or post-reset power up, the smart sensor IIOT device 120 will use the first communication information to attempt to communicate with the certain global computing server 250a. The certain global computing server 250a will identify the specific smart sensor IIOT device 120 and other information associating the smart sensor IIOT device 120 with a specific system level deployment of a specific customer. Based on the identification, the certain global computing server 250a will return second communication information (e.g., network communication parameters that identify a customer-based computing server 250b) to the smart sensor IIOT device 120. Subsequently, the smart sensor IIOT device 120 will engage in the second type of post-provisioning communication 252b.

The second type of post-provisioning communication 252b occurs when the smart sensor IIOT device 120 is operating in its normal operating state. The smart sensor IIOT device 120 may provide status and other types of information collected, generated, or otherwise available in the smart sensor IIOT device 120 to the customer-based computing server 250b. In addition, the smart sensor IIOT device 120 may receive controls, commands, directives, parameters, firmware, and any other type of digital or otherwise electronic information from the customer-based computing server 250b. The customer-based computing server 250b, as described in the non-limiting embodiments of FIG. 3, implements a web-based analysis and management tool (e.g., a cloud management and reporting platform) that is presented to the outside world via a management console window 246. In this way, a human or machine user may interact with individual smart sensor IIOT devices 120, groups of smart sensor IIOT devices 120, or entire system wide deployments of smart sensor IIOT devices 120. The user may retrieve information about any or all of the smart sensor IIOT devices 120 by manual request, automatic request, programmatic request, or on an event or schedule. The user may further direct commands to any or all of the smart sensor IIOT devices 120 by a manually entered directive, an automatic directive, a programmatic directive, or on an event or schedule.

In one exemplary and non-limiting embodiment, a method of mass-provisioning a plurality of industrial internet of things (IIOT) devices 120 in view of the system level deployments 200A, 200B, and 200C is now described.

In a factory, hundreds, thousands, millions, or some other number of smart sensor IIOT devices 120 are manufactured. The devices may be manufactured at the same time or at different times. Each of the smart sensor IIOT devices 120 has a system-wide unique identifier (SWUI) stored in its memory or otherwise embedded in its circuitry. The SWUI may be plain text, a hash, or an encrypted collection of bits, bytes, or the like. The SWUI may be formed from one or more parts or whole of an international mobile subscriber identity (IMSI) code, mobile country code (MCC), mobile network code (MNC), mobile sequential serial number (MSIN), integrated circuit card identifier (ICCID), international mobile equipment identifier (IMEI), mobile station ISDN number (MSISDN), MAC address, or some other extended unique identifier (EUI) information or combination thereof. In addition, each smart sensor IIOT device 120 is programmed with first communication information that identifies a certain global computing server 250a. In at least some cases, the first communication information is a fully qualified domain name (FQDN), which may be formed with or by a serial number, a corresponding IMSI, a MAC address, or some other additional or alternative information that may be realized as an internet uniform resource locator (URL). The FQDN, or URL as the case may be, is an internet or otherwise network-accessible address of the certain global computing server 250a. Accordingly, each smart sensor IIOT device 120 that is manufactured includes its own SWUI that is different from every other smart sensor IIOT device 120, and an FQDN that is the same as every other smart sensor IIOT device 120. This SWUI and FQDN information resides in every smart sensor IIOT device 120, and on initial deployment, or after a particular system reset, permits the smart sensor IIOT device 120 to operate in an initial default state.

At some point after manufacture, any number of smart sensor IIOT devices 120 are ready to be shipped. The shipping of smart sensor IIOT devices 120 may be instigated, for example, by a purchase order placed by a customer. In FIG. 3, for example, the city of Seattle may provide a purchase order to acquire 5,000 smart sensor IIOT devices 120 for a system level deployment 200A. At a same, earlier, or later time, the city of Schenectady may provide a purchase order to acquire 3,000 smart sensor IIOT devices 120 for a system level deployment 200B, and at a still same, later, or earlier time, the city of Fort Lauderdale may provide a purchase order to acquire 10,000 smart sensor IIOT devices 120 for a system level deployment 200C. Other methods of acquiring smart sensor IIOT devices 120 beside a purchase order are contemplated, other quantities of smart sensor IIOT devices 120 are contemplated, and other cities are contemplated.

In preparation to ship the smart sensor IIOT devices 120, a person, apparatus, computing device, or the like (e.g., a smart sensor IIOT device selection system) may identify a plurality of smart sensor IIOT devices 120. The smart sensor IIOT device selection system (not shown in FIG. 3) may group a subset of the plurality of smart sensor IIOT devices 120 into one or more batches of smart sensor IIOT devices 120. The batch or batches for Seattle, for example, comprise 5,000 smart sensor IIOT devices 120, the batch or batches for Schenectady comprise 3,000 smart sensor IIOT devices 120, and the batch or batches for Fort Lauderdale comprise 10,000 smart sensor IIOT devices 120. Even though all of the 18,000 smart sensor IIOT devices 120 are nearly identical (e.g., identical except for a different SWUI in each device), all of the devices are available for deployment in disparate geographic locations. The teaching of the present disclosure permits for efficient mass provisioning of any number of smart sensor IIOT devices 120.

In preparation for shipping to each location, a first input system (not shown in FIG. 3) will record the SWUI of each smart sensor IIOT device 120 that will go into a batch. A batch may be, for example, a group of 6, 12, or some other number of smart sensor IIOT devices 120 put into a box. Additionally, or alternatively a batch may be a group of 6, 9, 18, 36, or some other number of boxes grouped on a pallet. Other individual or nested batches are also contemplated. For each created batch, the first input system (not shown in FIG. 3) will retrieve, receive, create, or otherwise generate a batch identifier. The batch identifier may be an encoded number, or set of numbers, for example, and the batch identifier may be represented as a bar code, quick response (QR) code, flow code, radio frequency identifier (RFID) tag, or any other suitable machine-readable structure or batch identifier mechanism.

Each generated batch identifier is associated with the batch of smart sensor IIOT devices 120 or each smart sensor IIOT device 120 in the batch, or both the batch and each smart sensor IIOT device 120 in the batch. In addition, the generated batch identifier is associated with customer information that identifies the particular customer (e.g., city of Seattle, city of Schenectady, city of Fort Lauderdale, or some other customer) that will receive the batch of shipped smart sensor IIOT devices 120. In further addition, the generated batch identifier, customer, or generated batch identifier and customer will be associated with second communication information that identifies a certain customer-based computing server 250b. The second communication information may be, for example, another FQDN or URL that is an internet or otherwise network-accessible address of the certain customer-based computing server 250b. All of this information may be stored in one or more network accessible repositories (e.g., a database) that is communicatively coupled to the certain global computing server 250a, one or more customer-based computing servers 250b, or some other computing server.

The smart sensor IIOT devices 120 are shipped in any suitable manner, and by any suitable means, and at any suitable time to the respective customers. Some or all of the smart sensor IIOT devices 120 are deployed at any suitable time in any disparate geographical location. In the current exemplary embodiment of a method to mass provision a plurality of smart sensor IIOT devices 120 in accordance with FIG. 3, any or all of the subject cities may install the smart sensor IIOT devices 120 (e.g., smart streetlight controllers) in the NEMA sockets of any number of streetlights that will be in the system level deployment 200A, 200B, 200C.

Upon installation, each smart sensor IIOT device 120 will operate in its initial default state. In this initial default state, the particular smart sensor IIOT device 120 will retrieve and use its first communication information to communicate with the certain global computing server 250a via a first type of provisioning communication 252a. The first type of provisioning communication 252a from each smart sensor IIOT device 120 will include the SWUI of that particular smart sensor IIOT device 120.

Upon receiving the first type of provisioning communication 252a, the certain global computing server 250a will use the SWUI of the selected smart sensor IIOT device 120 to interrogate an available repository of information. Based on the SWUI, the certain global computing server 250a will retrieve the batch identifier associated with the SWUI. And based on the batch identifier, the customer information associated with the batch identifier, or any other information associated with the SWUI of the selected smart sensor IIOT device 120, the certain global computing server 250a will identify the system level deployment 200A, 200B, 200C that the selected smart sensor IIOT device 120 belongs to. From this information, the certain global computing server 250a will transmit second communication information back to the selected smart sensor IIOT device 120. As discussed herein, the second communication information includes parameters that permit the selected smart sensor IIOT device 120 to communicate with a customer-based computing server 250b that will provide its web-based analysis and management tool (e.g., an interface, portal, or management console window that serves information such as web pages to a user or other computing device).

Upon receiving the second communication information, the selected smart sensor IIOT device 120 stores the second communication information in its memory. From that point onward, the selected smart sensor IIOT device 120 performs the second type of post-provisioning communication 252*b* with its associated customer-based computing server 250*b*.

The customer-based computing server 250*b* will receive communication from the selected smart sensor IIOT device 120, and based on these communications, the customer-based computing server 250*b* will produce information for a network-based display of geographic information. For example, the customer-based computing server 250*b* will generate, with a web server, for example, at least one web page arranged to present a map and at least one icon presented on the map will represent the geographic location of the selected IIOT device.

As evident in the embodiment of mass provisioning a plurality of smart sensor IIOT devices 120 that was just described, the teaching herein permits any number of smart sensor IIOT devices 120 to be manufactured in an identical way with identical communication parameter information. The smart sensor IIOT devices 120 may be packaged and shipped in any suitable way to any particular customer. Because the systems record particular batch information (e.g., a batch identifier) and the system-wide unique identifier (SWUI) of each smart sensor IIOT device 120, then other information (e.g., the shipping date, shipping mechanism, deployment time, deployment date, deployment location, and other such information) is not necessary to provision any of the smart sensor IIOT devices 120. The express electronic operation of each smart sensor IIOT device 120 is improved for at least the reason that each device may be installed (e.g., with a bucket truck and electrical worker) at the top of a streetlight, deployed, and automatically re-programmed from an initial, default state of communicating with a certain global computing server 250*a* to an updated run-time state (e.g., a normal operating state) of communicating with a specific customer-based computing server 250*b* that is arranged to administer a cloud management and reporting platform (e.g., a web-based analysis and management tool) for a particular customer and for each smart sensor IIOT device 120 that the customer deploys. What's more, if at any time in the future the smart sensor IIOT device 120 needs to be redeployed, the device need only reset itself from its normal operating state to its initial default state. Then, when the smart sensor IIOT device 120 re-powers itself, it will go through the process of engaging in a first type of provisioning communication 252*a* with the certain global computing server 250*a*, and reprogramming itself for the second type of post-provisioning communication 252*b* with a same or new customer-based computing server 250*b*.

Figure 4B:
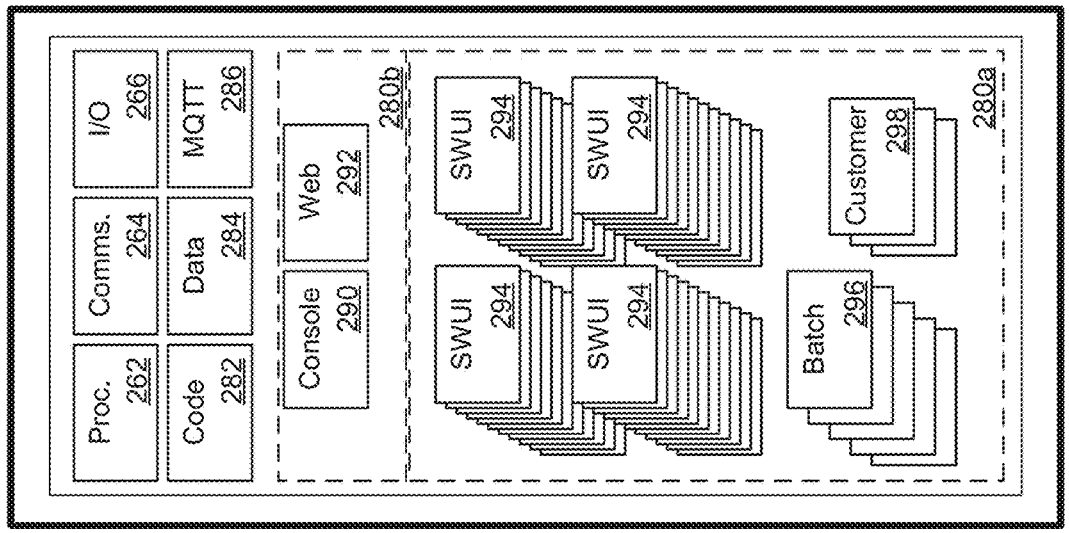
FIG. 4B is a computing server embodiment.
Figure 4A:
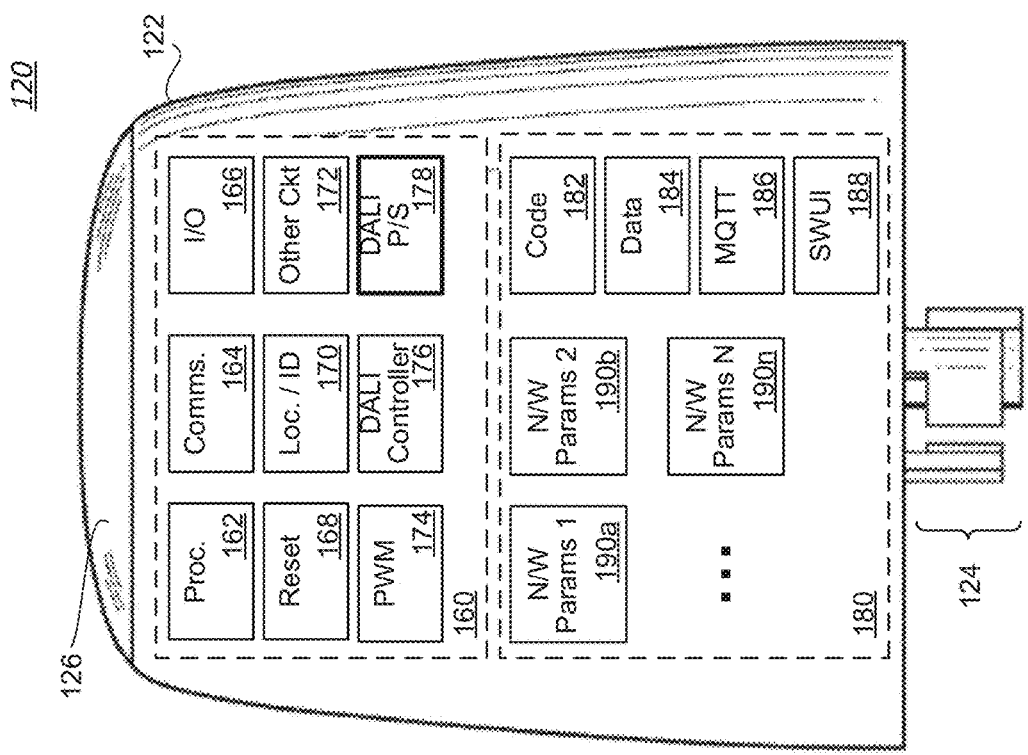
FIG. 4A is a smart sensor device embodiment.

FIG. 4A is a smart sensor device 120 embodiment. FIG. 4B is a computing server 250 embodiment. FIGS. 4A-4B may be individually or collectively referred to as FIG. 4. Structures earlier identified are not repeated for brevity.

The smart sensor device 120 of FIG. 4A is arranged with a generally cylindrical housing 122. The generally cylindrical housing 122 may be formed of a plastic, a glass, a metal, a composite material, or any other suitable material. The generally cylindrical housing 122 may in some cases have heat dissipation properties to assist in the removal of heat generated by electronic circuitry inside the housing. In at least some cases, the generally cylindrical housing 122 is arranged to resist the nesting birds or other animals. In at least some cases, the generally cylindrical housing 122 is arranged to resist accumulation of dirt, snow, or any foreign bodies or materials. In at least some cases, the generally cylindrical housing 122 is symmetrically arranged to have a generally same visual appearance when viewed from any perspective.

The generally cylindrical housing 122 includes a connector 124 (e.g., a set of "pins") that is compliant with a standardized powerline interface. In the embodiment of FIG. 4A, the standardized powerline interface is roadway area lighting standard promoted by a standards body such as ANSI C136.41 (e.g., a NEMA-based connector/socket system), but other standardized powerline interfaces are contemplated (e.g., an interface compliant with the ZHAGA CONSORTIUM, which is an international association that creates industry standards in the LED lighting industry). When the smart sensor device 120 is deployed, the pins of the connector 124 mate with a corresponding receptacle (e.g., a socket) that is integrated in a streetlight, a luminaire, a control box, or some other structure, which permits electro-mechanical coupling of the smart sensor device 120 to the streetlight, luminaire, control box, or the like.

The generally cylindrical housing 122 of the smart sensor device 120 includes a light-transmissive surface 126. The light transmissive surface may be transparent or partially transparent (e.g., partially opaque). In some embodiments, the light-transmissive surface 126 is integrated with the generally cylindrical housing 122, and in other cases, the light-transmissive surface 126 is a distinct structure that is removably or fixedly coupled to the generally cylindrical housing 122. In the embodiment of FIG. 4A, the light-transmissive surface 126 is arranged at a "top" of the smart sensor device 120, but in at least some embodiments, the light-transmissive surface 126 is formed additionally or alternatively in or through a surface wall of the generally cylindrical housing 122. Generally, the light-transmissive surface 126 permits ambient light to reach an electronic light sensor (e.g., a photosensor, which is not shown in FIG. 4) formed within a volumetric cavity inside the generally cylindrical housing 122. The light sensor is arranged, in at least some cases, to provide a first output signal that directs a light source to illuminate when light reaching the light sensor crosses a determined first threshold, and to provide a second signal (e.g., an alteration of the first signal or a different signal) when the light reaching the light sensor crosses a determined second threshold. In some cases, the first and second thresholds are the same thresholds, and in some cases, the first and second thresholds are different thresholds.

One of skill in the art will recognize that the smart streetlight controller embodiment of FIG. 4A is non-limiting. In other cases, rather than a streetlight controller, or rather than a streetlight controller in the generally cylindrical housing 122, the device of FIG. 4A may be realized as any suitable smart sensor IIOT device 120 as described herein.

The smart sensor IIOT device 120 depicted in FIG. 4A, and in fact the smart devices contemplated in the present disclosure, are understood by those of skill in the art to apply to many types of smart devices including small cells, smart hubs, smart streetlight controllers, smart monitor devices, and many others. The embodiment of FIG. 4A includes a microcontroller 160. The smart sensor IIOT device 120 also includes a standardized powerline interface 124, which in the embodiment of FIG. 4A is along the lines of, but not limited to, a NEMA-based connector.

The microcontroller 160 is arranged with a processor 162, a communications module 164, an input/output (I/O) module 166, reset circuitry 168, a location/identification module 170 (e.g., global positioning system (GPS), MAC ID, IMEI module, or some other unique location or identification structure), and certain other circuits 172. Additionally, microcontroller may optionally include a pulse width modulation (PWM) circuit 174, a digital addressable lighting interface (DALI) controller 176, and a DALI power supply 178. The microcontroller 140 is represented with a dashed line box to make clear that in some cases, the various circuits and modules are included in a single microcontroller package, and in other cases, any one or more of the modules 162-178 may be partially included in a microcontroller package and partially outside a microcontroller package, or any one or more of the modules 162-178 may be entirely outside of the microcontroller package. Additionally, any one or more of the modules 162-178 may be optionally included or excluded. The particular description herein with respect to the smart sensor IIOT device 120 of FIG. 4A does not divert from the teaching of the present disclosure, and any particular representation herein is not limiting unless expressly limited in the claims that follow.

In addition to the microcontroller 160, the smart sensor IIOT device 120 also includes memory 180. The memory may in some cases be included in the microcontroller 160, in any particular module of the microcontroller 160, or in a separate and distinct package. The memory 180 includes storage space for executable software instructions, which, when executed by processor 162, cause the smart sensor IIOT device 120 to perform any particular programmed acts. The memory 180 also includes an area to store data that is captured, received, created, determined, or in any other way generated. Implementations of a communications protocol 186 may be stored in the memory 180. The communications protocol may be any suitable protocol. In at least one embodiment, such as the embodiment of FIG. 4A, a suitable communications protocol is a message queueing telemetry transport (MQTT) protocol.

Memory 180 includes storage for a system-wide unique identifier 188 (SWUI). The SWUI 188 may be stored in clear text. The SWUI 188 may be encrypted, hashed, or obfuscated in some other way. In some cases, the SWUI 188 is generated, populated, or otherwise implemented in cooperation with the communications module 164, the location/identification module 170, or some other electronic circuitry (e.g., module) of the smart sensor IIOT device 120.

As described herein, the SWUI 188 may be formed from one or more parts or whole of an international mobile subscriber identity (IMSI) code, mobile country code (MCC), mobile network code (MNC), mobile sequential serial number (MSIN), electronic serial number (ESN), integrated circuit card identifier (ICCID), international mobile equipment identifier (IMEI), mobile station ISDN number (MSISDN), MAC address, one-time random number generator, or some other extended unique identifier (EUI) information or combination thereof.

Memory 180 may also include communication information in the form of one or more sets of network parameters. In the embodiment of FIG. 4A, the memory 180 includes a first set of network parameters 190a, a second set of network parameters 190b, and an Nth set of network parameters 190n. In at least some cases, the communication information (i.e., network parameters) may include a fully qualified domain name (FQDN), which may be formed with or by a serial number, a corresponding IMSI, MAC address, or other additional or alternative information that may be realized as an internet uniform resource locator (URL). The FQDN, or URL as the case may be, is an internet or otherwise network-accessible address of a computing server 250.

In some cases, the first set of network parameters 190a are factory loaded to default to a certain global computing server 250a. When the smart sensor IIOT device 120 is operating in its initial default operating mode, any communications from the smart sensor IIOT device 120 (e.g., via communications module 164), may be transmitted toward the certain global computing server 250a. Cooperatively, the reset circuitry 168 may force the smart sensor IIOT device 120 to its initial default operating mode so that any further communications are also transmitted toward the certain global computing server 250a. In this way, the reset circuitry 168 may optionally be operated manually, electronically, or programmatically, and the smart sensor IIOT device 120 is prevented from being "bricked" (i.e., rendered inoperable and unable to communicate) unless in the case of a hardware failure.

After the smart sensor IIOT device 120 is deployed and operating using a first type of provisioning communication 252a, updated communication information may be stored in second set of network parameters 190b, a third set of network parameters, or an Nth set of network parameters 190n. In this way, a single smart sensor IIOT device 120 may be directed to communicate with a primary customer-based computing server 250a, a secondary customer-based computing server, and any suitable number of other computing servers.

In the embodiment of FIG. 4A, the processor 162 is arranged to execute software instructions (i.e., code 182) stored in the memory 180. The execution of such code 182 may include retrieving particular data 184 stored in the memory 180, and in at least some cases, the cooperation between the executing software code 182 and the data 184 stored in the memory 180 causes the I/O module 166 to operate the PWM circuitry 174, the DALI controller 176, the DALI power supply 178, or any of the other circuitry 172. In at least one example, executed code 182 is arranged to direct output of visual light from a corresponding luminaire in accordance with a pulse width modulate (PWM) signal generated by the PWM module 174.

As described herein, the smart sensor IIOT device 120 is arranged to operate semi-autonomously. The smart sensor IIOT device 120 may communicate status information, warning information, alerts, or any other suitable information toward a customer-based computing server 250b. The information may be communicated on a schedule, at a request, or upon an event. The information, once passed, may be used, for example, to populate one or more web pages deliverable to a user via a web-based management tool. In order to perform such communication, the information may be passed to and from the smart sensor IIOT device 120 via the communications module 164.

In the embodiment of FIG. 4A, the communications module 164 may be arranged as a wireless connection device capable of communicating on any suitable medium (e.g., radio frequency (RF), optical, audio, ultrasound, or some other part of the electromagnetic spectrum). In at least some cases, the communications module 164 is arranged for a communication medium that conforms to a cellular or cellular-based protocol (e.g., 4G, LTE, 5G, 6G, or the like).

Notwithstanding the discussion herein, one of skill in the art will recognize that the DALI modules 176, 178 are optional and may be implemented in a variety of ways without diverting from the teaching of the present disclosure.

Turning to FIG. 4B, in some configurations, the computing server 250 is arranged as a certain global computing server 250a of FIG. 3. In these or other configurations, the computing server 250 of FIG. 4A is arranged as a customer-based computing server 250b of FIG. 3. Accordingly, the computing server 250 may be a local computing server, global computing server, or some other type of computing server. In addition, in a least some cases, the computing server 250 of FIG. 4B may operate at a first time as a certain global computing server 250a that enables a first type of provisioning communication 252a with any selected smart sensor IIOT device 120, and the same computing server 250 may operate at a second time as a customer-based computing server 250b that enables a second type of post-provisioning communication 252b with any selected smart sensor IIOT device 120. In some cases, the first time is before the second time; in some cases, the second time is before the first time, and in some cases, the first and second times are concurrent times wherein the computing server may concurrently engage in both the first type of provisioning communications 252a and the second type of post-provisioning communications 252b with different smart sensor IIOT devices 120.

Computing server 250 includes a processor 262 arranged to retrieve and execute software instructions (i.e., code 282) in order to carry out the functions of the computing server 250. Operational data, parameters, working memory, and other data 284 may be generated, retrieved, stored, or otherwise used.

The computing server 250 includes a communications module 264, input/output (I/O) circuitry 266, and an implementation of a communications protocol 286. The communications protocol 286 may be any suitable protocol. In at least one embodiment, such as the embodiment of FIG. 4B, a suitable communications protocol is a message queueing telemetry transport (MQTT) protocol. In this way, the computing server 250 and any number of smart sensor IIOT devices 120 may efficiently and effectively implement low overhead data transfer. At the physical layer, the communications module 264 of the computing server 250 may implement any known type of wired communications, wireless communications, or a combination of wired and wireless communications.

In some cases, the computing server 250 is arranged to implement functions of certain global computing server 250a (FIG. 3). In these embodiments, the computing server 250 may optionally include, or otherwise have access to, an optional global computing server memory 280a, which is organized with any one or more of an SWUI repository 294, a batch identifier repository 296, and a customer information repository 298.

In some cases, the computing server 250 is arranged to implement functions of customer-based computing server 250b (FIG. 3). In these embodiments, the computing server 250 may optionally include, or otherwise have access to, an optional customer-based computing server memory 280b, which is organized with any one or more of a web-based analysis and management tool 290, which is arranged to provide a management console window, and a web server 292. When so included, the web server 292 is arranged to retrieve, generate, facilitate, or otherwise serve any number and form of web pages through a management console window user interface.

Figure 5:
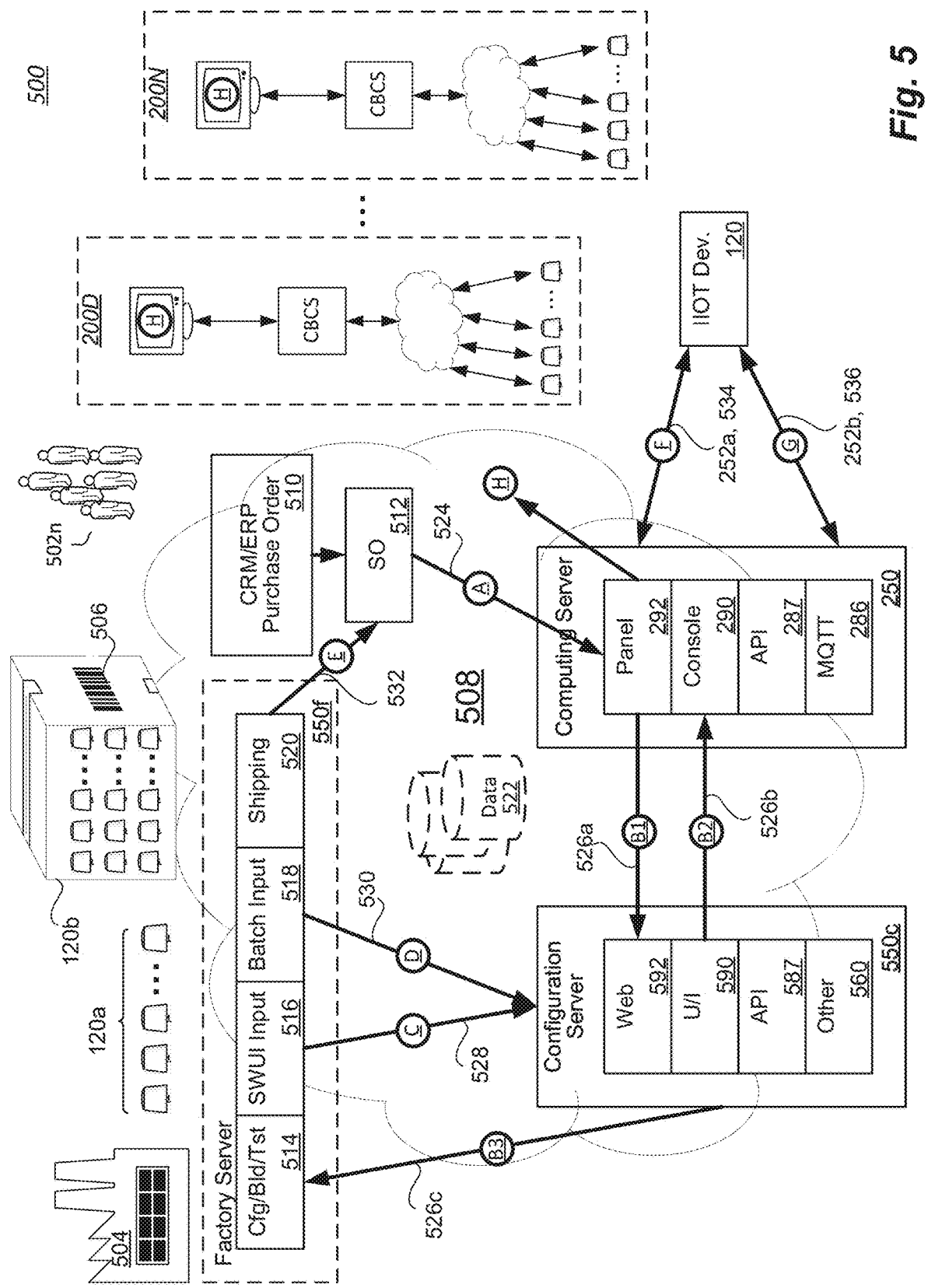
FIG. 5 is a system of IIOT device provisioning on a large scale.

FIG. 5 is a system 500 of IIOT device provisioning on a large scale. Several structures and sub-structures of FIGS. 1 to 4 are evident in the system 500 of FIG. 5.

A plurality of customers 502n are managers, executives, technical staff, electricians, maintenance supervisors, business leaders, elected officials, appointed officials, and any other people or entities that would purchase or otherwise carry out acts to acquire the types of smart sensor IIOT devices 120 discussed in the present disclosure. In at least some cases, the customers 502n represent cities, municipalities, departments of transportation or other departments, utilities, or the like that purchase, deploy, maintain, control, or otherwise interact with networks of one or any number (e.g., dozens, hundreds, thousands, millions) of smart sensor IIOT devices 120.

A factory 504 produces, manufacturers, assembles, or in any other way participates in one or more acts that facilitate the acquisition of smart sensor IIOT devices 120 by any number of customers 502n. Accordingly, while the term, "factory," is used in the present disclosure, the term is not so limited. Instead, the factory 504 of the present disclosure may be any entity that facilitates putting smart sensor IIOT devices 120 into the stream of commerce in harmony with the teaching of the present disclosure.

As evident in the system 500 of FIG. 5, the factory 504 is engaged in acts that produce smart sensor IIOT devices 120a in any state of manufacture. The smart sensor IIOT devices 120a may, for example, be or include raw materials, housings, circuit boards, software, firmware, and the like. In at least some cases, a final state of the smart sensor IIOT devices 120a includes configuration to operate in an initial default state as described herein.

After the factory 504 completes an assembly of smart sensor IIOT devices 120a into smart sensor IIOT devices 120, which are ready for deployment, the factory 504 or another entity associated therewith will accumulate any number of smart sensor IIOT devices 120 into one or more groups, sub-groups, batches, sub-batches, sets, subsets, or the like and ready the accumulated smart sensor IIOT devices 120 for packing and shipment to a warehouse, storage facility, customer or the like. For convenience and clarity in the present disclosure, this accumulation may be described as batching or collecting a subset of a large plurality of smart sensor IIOT devices 120 into a batch of smart sensor IIOT devices 120b.

In at least some cases, a batch identifier 506 will be associated with each batch of smart sensor IIOT devices 120b. The batch identifier 506 may be any one or more of a code, a numerical value in any numerical system (e.g., binary, decimal, hexadecimal, or the like), an alphanumeric value, an alphabetic value, an icon-based identifier, a machine-readable identifier, a human-readable identifier, or any representation of such code or value. In the system 500 of FIG. 5, a batch identifier 500 includes a numeric value, which may be stored and otherwise processed by a computing system along with a representation of the numeric value embodied as a barcode affixed to a shipping box that contains a batch of smart sensor IIOT devices 120b.

The system 500 of FIG. 5 includes all or some portion of one or more communication networks 508. The communication network 508 may include one or more wired mediums, one or more wireless mediums, or a medium in any suitable portion of the electromagnetic spectrum. The communication network 508 may, for example, include all or some portion of one or more wide area networks (WAN) such as the internet or a cellular communications network (e.g., the worldwide web, a cellular-based network in accordance with one or more cellular-based technologies, and the like), one or more local area networks (LAN) such as Ethernet or a WIFI mesh, and one or more personal area networks (PAN) such a BLUETOOTH network. Other network topologies, median, and associated protocols are contemplated.

The communication network 508 of the system 500 overlaps, weaves through, enables, or facilitates communications amongst a wide plurality of computing devices. For this reason, various computing devices of the system 500 are represented in a non-limiting way as fully or partially within, overlapping, or communicatively coupled to the communication network 508.

The system 500 includes a first computing server 250, which is along the lines of the computing server 250. The system 500 also includes a configuration computing server 550c and a factory computing server 550f. The computing server 250 may operate sequentially, alternatively, simultaneously, or concurrently as one or both, as the case may be, of a certain global computing server 250a and a customer-based computing server 250b. In at least some cases, one or more of the computing server 250, the configuration computing server 550c, and the factory computing server 550f are implemented in a same computing server. That is, some or all of the functionality attributed to one or more of the computing servers described herein may be implemented via a single computing machine, a pair of computing machines, a networked group of computing machines, a farm of computing machines, a cloud of computing machines, and the like. In this way, the certain global computing server 250a may further be implemented with features, modules, or other such functionality of a configuration computing server 550c, a factory computing server 550f, or both the configuration computing server 550c and the factory computing server 550f without departing from the description of features provided by the certain global computing server 250a. And the customer-based computing server 250b may further be implemented with features, modules, or other such functionality of a configuration computing server 550c, a factory computing server 550f, or both the configuration computing server 550c and the factory computing server 550f without departing from the description of features provided by the customer-based computing server 250b.

The configuration computing server 550c is arranged facilitate product ordering, product configuration, product fulfilment, customer relationship management (CRM), enterprise resource planning (ERP), purchase order management, sales order generation, invoicing, billing, warranty claims, and any other like business-centric services.

The factory computing server 550f is arranged to receive, transmit, generate or otherwise process product configuration information, product build information, product certification information, product testing information, forecasting information, product ordering information, customer fulfilment information, customer shipping information, raw materials management information, and the like. The factory computing server 550f may be or include a conventional computing server architecture. Alternatively, or in addition, the factory computing server 550f is represented in broken lines (e.g., dashed lines) to illustrate that this server 500f may include distributed computing structures, configuration hardware, test hardware, and number of input systems, output systems, or input/output (I/O) systems to carry out the acts of the factory 504. The computing servers of FIG. 5 (i.e., computing server 250, configuration computing server 550c, factory computing server 550f, and the CBSC structures of system level deployments 200D, 200N) may include structures, circuits, modules, libraries, applications, drivers, operating systems, and other software and hardware that is not shown in FIG. 5. The presence of these structures, which are not shown to avoid unnecessarily obscuring the other structures described in the present description of the system 500, will be recognized by one of skill in the art.

The various computing systems of the system 500 cooperate to provision a plurality of smart sensor IIOT devices 120 on a large scale. The computing server 250 facilitates such provisioning with a communication protocol MQTT module 286, an application programming interface (API) module 287, a console module 290, and a panel module 292. The configuration computing server 550c facilitates such provisioning via an API module 587, a user interface (U/I) module 590, and a web module 592. Other modules 560 may in some cases perform or facilitate configuration of a sales process, smart sensor IIOT devices 120, factory interface operations, and the like. The factory computing server 550f facilitates the large scale provisioning of smart sensor IIOT devices 120 via a configuration/build/test module 514, a system-wide unique identifier (SWUI) input system 516, a batch identifier input system 518, and a shipping module 520. Each or all of the computing systems of the system 500 of FIG. 5 may store, retrieve, and associate information via one or more repositories 522.

The one or more repositories 522 of FIG. 5 may be local repositories, remote repositories, global repositories, dedicated repositories, network-accessible repositories, or some other type of repositories. In some cases, the one or more repositories 522 are a single repository. In some cases, the one or more repositories 522 are implemented as a plurality of repositories. In at least some cases, one or more of the SWUI repository 294, the batch identifier repository 296, and the customer information repository 298 of FIG. 4B is implemented as the one or more repositories 522 of the system 500 in FIG. 5.

A non-limiting embodiment of a system 500 to order, receive, deploy, and provision a plurality of smart sensor IIOT devices 120 is now described. A sequence of acts (i.e., "A," "B1," "B2," "B3," "C," "D," "E," "F," "G," and "H,") illustrate a flow of data to implement the provisioning.

A customer 502n desires to order some number, "X," of smart sensor IIOT devices 120. In this case, X is an integer greater than zero and may be any number such as 100, 500, or 5000. Via the CRM and ERP functions of a certain manufacture, designer, owner, or the like of the smart sensor IIOT device technology, the customer 502n knows to generate and submit a purchase order (PO) 510 for the X smart sensor IIOT devices 120.

The purchase order 510 may be an electronic PO, a phone-based PO, a written paper PO, or some other type of purchase order. In some cases, each received purchase order will have a unique purchase order code that can be used to link information on the purchase order with, for example, the exact smart sensor IIOT devices 120 that will fulfill the purchase order, shipped packages of smart sensor IIOT devices 120, certain batches of smart sensor IIOT devices 120, and the like. The purchase order 510 will include customer information. The customer information may include any one or more of an order date, an order time, a shipping date, a delivery date, a distributor information identifier, a sales agent identifier, a customer identification number (e.g., a customer identifier), an end-customer identifier, a shipping address, a billing address, an amount of money authorized to purchase the smart sensor IIOT devices 120, a unique panel identifier (e.g., to generate a fully qualified domain name (FQDN) as part of deploying a web-based management tool), contact information, a quantity of smart sensor IIOT devices 120, a description of the smart sensor IIOT devices 120, and other terms and conditions of sale or other such acquisition.

From the purchase order 510, and via the CRM and ERP functions of the certain manufacture, designer, owner, or the like of the smart sensor IIOT device technology, a sales order 512 is generated. The sales order 512 confirms the information on the purchase order 510 an effectively accepts the order and terms for fulfilment. In at least some cases, the sales order initiates a processes to order, configure, manufacture or otherwise build, test, account for, track, ship, deploy, and provision (i.e., install and operate) the desired number X of smart sensor IIOT devices 120.

In a first act, A, 524 to install and operate the X smart sensor IIOT devices 120, the sales order is passed through the computing server 250. The sales order 512, or information associated with the sales order 512, may be entered via a web-based interface implemented with panel module 292. Processing in the panel module 292, or in some other functional modules of the computing server 250, advances the process to fulfil the sales order 512.

A second act, B, 526a, 526b, 526c to install and operate the X smart sensor IIOT devices 120, is facilitated with one or more non-limiting sub-acts, "B1," "B2," and "B3." Other suitable numbers of communications are contemplated, however, three communicative acts are described to illustrate this portion of the teaching. In the second act, at B1, information is passed from the computing server 250 to the configuration computing server 550c.

The communication of the information at B1 526a may be facilitated via the panel module 292 and the web module 592. Alternatively, or in addition, the communication may be facilitated by and between the API modules 287, 587. Such communication may be machine-to-machine communication or may involve user oversight, user input, or other user action. In at least some instances, such communications are implemented with one or more representational state transfer (REST) protocols, architectures, modules, coding styles, and the like.

Information communicated at B1 526a includes at least some information from the sales order 512. In some cases, additional information may be queried, interrogated, searched-for, and otherwise retrieved from a repository 522. Using the information communicated at B1 526a, the configuration computing server 550c instantiates two additional communications of information at B2 526b and B3 526c.

Information communicated at B2 526b includes information to update the sales order 512, confirmation that the sales order 512 will be fulfilled, and confirmation that the factory 504 will be engaged to build or otherwise deliver the X smart sensor IIOT devices 120. Other information to be communicated back to from the configuration computing server 550c to the computing server 250 is also contemplated.

Information communicated at B3 526c includes information that engages the factory 504. The information may include configuration information for the smart sensor IIOT devices 120, the quantity X, customer information, shipping information, mobile network operator (MNO) information, product SKU information, and any other such information. The information communicated at B3 526c may be electronically transferred via communication network 508.

Once the factory 504 is engaged, the X smart sensor IIOT devices 120 will be configured, built, tested, and prepared for shipment to the customer's directed shipping address. Module 514 may facilitate the configuration, build, and testing operations.

In some cases, the X smart sensor IIOT devices 120 are realized as M batches of smart sensor IIOT devices 120, wherein each of the M batches includes N smart sensor IIOT devices 120. For example, if a customer 502n orders 2,400 (i.e., X=2,400) smart sensor IIOT devices 120, the factory 504 may prepare 100 batches (i.e., M=100) of 24 (i.e., N=24) smart sensor IIOT devices 120. In this non-limiting example, the factory 504 may package 24 smart sensor IIOT devices 120 in a shippable box, and the factory 504 will deliver 100 such boxes to the customers designated shipping address.

At the factory 504, a first input system, SWUI input module 516, records a system-wide unique identifier (SWUI) drawn or otherwise retrieved from each of the smart sensor IIOT devices 120. The recorded SWUI's may be directly stored in a repository such as the one or more repositories 522. In view of the present example, the SWUI of all X (i.e., 2,400) smart sensor IIOT devices 120 will be captured.

Also at the factory 504, a second input system at batch input module 518 is arranged to associate a batch identifier 506 with each batch of smart sensor IIOT devices 120. In view of the present example, the batch input module 518 will retrieve, capture, receive, generate, or otherwise isolated M (i.e., 100) batch identifiers 506, and associate each of the M batch identifiers with a different batch of N (i.e., 24) smart sensor IIOT devices 120. The isolated batch identifiers 506 may be directly stored in a repository such as the one or more repositories 522.

In at least some cases, the SWUI input module 516 and the batch input module 518 will operate as smart sensor IIOT devices 120 are prepared for shipping, and shipping boxes are filled with smart sensor IIOT devices 120. The first input system (i.e., the SWUI input module 516) will read, capture, receive, or otherwise isolate the SWUI of N (i.e., 24) smart sensor IIOT devices 120, and the second input system (i.e., the batch input module 518) will read, capture, receive, generate, or otherwise isolate a particular batch identifier 506. The batch identifier is associated with each of the N SWUI's, and the N smart sensor IIOT devices 120 having the N SWUI's will be packed in a shipping box. A representation of the batch identifier 506 will be affixed to the shipping box having the N smart sensor IIOT devices 120 whose SWUI was recently captured. This process will continue until all M (i.e., 100) batches of smart sensor IIOT devices 120, each batch having N (i.e., 24) smart sensor IIOT devices 120, are prepared the X (i.e., 2,400) smart sensor IIOT devices 120 are ready to ship.

In a third act, C 528, to install and operate the X smart sensor IIOT devices 120, the SWUI's of each of the smart sensor IIOT devices 120 is communicated to the configuration computing server 550c.

In a fourth act, D 530, to install and operate the X smart sensor IIOT devices 120, each of the batch identifiers 506 is communicated to the configuration computing server 550c. The information communicated includes an associated of each batch identifier 506 with the specific SWUI's of smart sensor IIOT devices 120 that are included in the batch. In addition, each batch identifier is associated with a specific customer.

The configuration computing server 550c, or the computing server 250, will store the SWUI's in the SWUI repository 294. In some cases, the SWUI repository 294 is local to the computing server 250 and in other cases, the SWUI repository 294 is realized in the network-accessible one or more repositories 522. Also, the configuration computing server 550c, or the computing server 250, will store the batch identifiers 506 in the batch identifier repository 296. In some cases, the batch identifier repository 296 is local to the computing server 250 and in other cases, the batch identifier repository 296 is realized in the network-accessible one or more repositories 522. In all of these cases, information from the customer information repository 298, which may be local to the computing server 250 or realized in the one or more repositories 522, and which was originally associated with the purchase order 510, sales order 512, or both the purchase order 510 and sales order 512, will be associated with the batch identifiers 506 and SWUI's of each of the smart sensor IIOT devices 120. Based on the acts of the SWUI input module 516, the batch input module 518, and the third and fourth acts C 528, D 530, respectively, each smart sensor IIOT device 120 that is shipped from the factory 504 will be knowingly associated with a specific customer. And if any unknown smart sensor IIOT device 120 is encountered, then one or more of the repositories 522, or one or more of the on-board repositories of the computing server 250 (i.e., SWUI repository 294, batch identifier repository 296, customer information repository 298), may be used to determine which customer originally acquired the unknown smart sensor IIOT device 120.

Concurrent with a fifth act, E 532, to install and operate the X smart sensor IIOT devices 120, the M (i.e., 100) boxes of smart sensor IIOT devices 120 are shipped to the destination designated by the customer 502*n*. In the fifth act E 532, the sales order is updated with information relevant to the fulfilment. The information may include asset tracking information, batch identifier information (e.g., bar codes, RFID's, shipping confirmation numbers, and the like), shipping information, shipping dates, shipping carrier information, invoicing, and the like.

After the customer 502*n* receives any of the X (i.e., 2,400) smart sensor IIOT devices 120, the customer 502*n* may begin installing the smart sensor IIOT devices 120 in disparate geographic locations. The customer 502*n* may receive all X (i.e., 2,400) devices at once, or various ones of the M (i.e., 100) batches of smart sensor IIOT devices 120 may be received. The system 500 does not require any particular order of installation, timing of installation, location of installation, or any other such restrictions. The system 500 of IIOT device provisioning on a large scale is robust, and the customer 502*n* is provided with substantial freedom to deploy the smart sensor IIOT devices 120 acquired in any suitable way.

Installation of the smart sensor IIOT devices 120 by the customer 502*n* is handled along the lines of deployment described with respect to FIG. 3. When any of the X (i.e., 1000) smart sensor IIOT devices 120 is powered on, the device will boot into its initial default mode. The selected smart sensor IIOT device 120 will retrieve its first communication information from a memory, and use the information to communicate with a certain global computing server 250 (i.e., certain global computing server 205*a*) that is identified by the first communication information.

Figure 6:
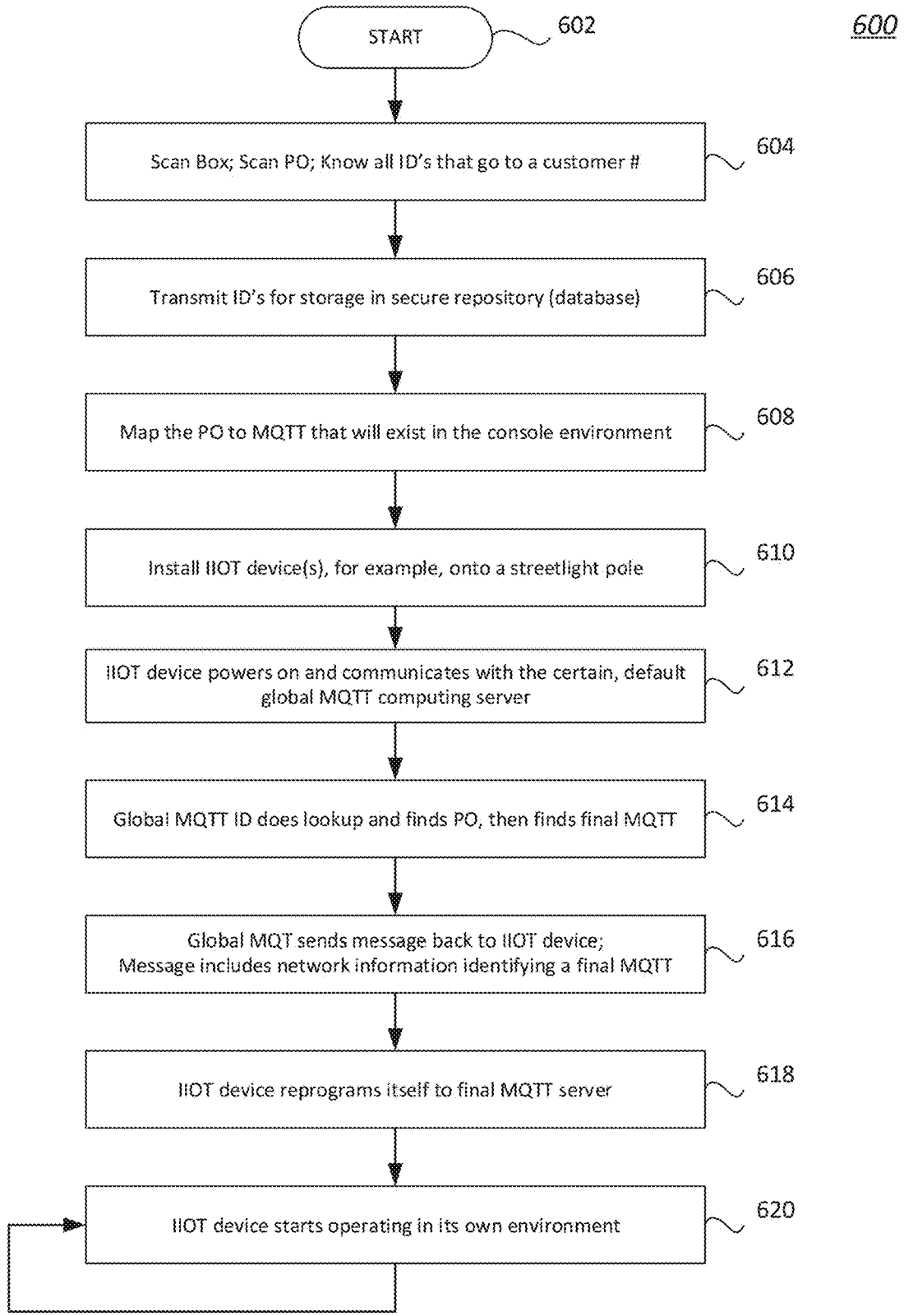
FIG. 6 is a data flow diagram representing processing during IIOT device provisioning at a large scale.

A sixth act, F 534, to install and operate the X smart sensor IIOT devices 120, is represented in FIG. 6 as the initial communication with the computing server 250. The information communicated by the particular smart sensor IIOT device 120 includes the system-wide unique identifier (SWUI) of the particular smart sensor IIOT device 120. Using the SWUI, the computing server 250 queries one or more network-accessible repositories 522 or local repositories (i.e., system-wide unique identifier (SWUI) repository 294, batch identifier repository 296, customer information repository 296) to identify, which of the batch identifiers is associated with the SWUI, and which customer information is associated with the SWUI. Upon retrieving this information, the computing server 250 produces a fully qualified domain name (FQDN) or other suitable information that may be used to produce an FQDN, and returns such information back to the smart sensor IIOT device 120 that initiated the communication.

Upon receiving the communication from the computing server 250, the particular smart sensor IIOT device 120 stores the received information as second communication information.

In a seventh act, G 536, to install and operate the X (i.e., 1000) smart sensor IIOT devices 120, the particular smart sensor IIOT device 120 uses the second communication information to communicate with the computing server 250. In this case, the computing server 250 is arranged as a customer-based computing server along the lines of customer-based computing server 250*a* in FIG. 3.

In an eighth act, H, to install and operate the X smart sensor IIOT devices 120, a computing server 250 is arranged as a customer-based computing server 250*b* (FIGS. 3, 4B). In these cases, the panel module 292 and console module 290 implement features of a web-based analysis and management tool. Using the description of the present disclosure associated with the system 500 of FIG. 5, it will be evident that the customer 502*n* can install any or all of the M (i.e., 100) batches of N (i.e., 24) smart sensor IIOT devices 120. That is, any number of the X (i.e., 1000) smart sensor IIOT devices 120 may be installed in the city at any time and in any order. Each time a new smart sensor IIOT device 120 is installed, the device will first communicate in its initial default mode to a certain global computing server 250, and the device will be redirected (e.g., provisioned) to communicate with a particular customer-based computing server 250 having an instantiation associated expressly with the respective customer 502*n*.

As evident in the system 500 of FIG. 5, any number of smart sensor IIOT devices 120 may be deployed into any number of system level deployments. A fourth system level deployment 200D is represented in FIG. 5, along with any other number of such deployments, and including an Nth system level deployment 200N. Each system level deployment stands on its own, and once its respective smart sensor IIOT devices 120 are automatically provisioned, the deployment will operate with all of its devices (not numbered in system level deployments 200D, 200N) communicated through a communications network (not numbered in system level deployments 200D, 200N) to a customer-based computing server CBCS and providing a console window on an electronic display of the respective customer.

FIG. 6 is a data flow 600 diagram representing processing during IIOT device provisioning at a large scale. Processing begins at 602.

At 604, a batch of smart sensor IIOT devices 120 are packaged in a shipping box. As each device is selected for shipping, a system-wide unique identifier (SWUI) of the device is isolated. The isolation may be performed manually, electronically, programmatically, or in some other way. For example, the isolation may be performed with a handheld or machine-based barcode reader, RFID reader, or some other terminal to capture such information. Correspondingly, along with the isolation of each SWUI, certain identification information from a purchase order, sales order, or the like is also isolation. The order information identifies the customer for the smart sensor IIOT devices 120 being packaged. Accordingly, information associating the SWUI of each smart sensor IIOT device 120 that will be shipped to a customer is electronically recorded. By following such process, the "owner" or original acquiring entity of any smart sensor IIOT device 120 associated with the manufacturer of such smart sensor IIOT devices 120 can be quickly ascertained. Processing advances to 606.

At 606, the captured SWUI and customer information is transmitted to a computing server for storage in a secure repository (e.g., a relational or other type of database, an encrypted storage medium, or the like). In at least some cases, batch identifiers are also captured and stored. A batch identifier may, for example, include an identifier of every box, pallet, or other shipping container of smart sensor IIOT devices 120 being sent to a particular customer. Processing advances to 608.

At 608, in the computing server, the purchase order identifier is mapped to certain communications information that will operate as a web-based analysis and management tool. A particular transport protocol for interactions between each of the smart sensor IIOT devices 120 and a console interface of the web-based analysis and management tool is identified as MQTT. Such protocol permits reliable and robust, lightweight, low bandwidth communications.

In addition the mapping the customer's purchase order to the customer-based computing server environment, the customer-based computing server environment is configured, instantiated, and loaded with default initialization data. Certain network address commination parameters (e.g., a fully qualified domain name (FQDN)) are created. Processing advances to 610.

At 610, the customer or its surrogate installs one or more of the smart sensor IIOT devices 120. The installer does not need to take any particular care to know the SWUI of any device that is installed, or where each device will be installed, or when each device will be installed. Processing advances to 612.

At 612, one or more of the smart sensor IIOT devices 120 is installed and powers on. The device or devices retrieve the default network communication parameters programmed into the device at the time of manufacture. Using the default networking information, the device begins communicating with the certain global computing server. In fact, the first communications from every smart sensor IIOT device 120 that is deployed will be with the MQTT global computing server. In each communication with the global computing server, the smart sensor IIOT device 120 initiating the communication will also communicate its SWUI. Processing advances to 614.

At 614, the global computing server will provide one or more queries into one or more repositories. Based on information associated with the sending device's SWUI, the global computing server will retrieve or otherwise isolate the purchase order, customer identifier, or some other information that indicates where the status inquiry and device management will be operated from. In at least some cases, the global computing server will isolate the FQDN of the customer-based computing server that will host the web-based analysis and management tool. Processing advances to 616.

At 616, the MQTT global computing server communicates the FQDN of the customer-based computing server back to the smart sensor IIOT device 120 that initiated the communication. Processing advances to 618.

At 618, the smart sensor IIOT device 120 receives updated network parameters or other such information that permits the device to communicate with its dedicated smart sensor IIOT device 120 management tool. The smart sensor IIOT device 120 reprograms itself to communicate with the customer-based computing server. From this point forward, the respective smart sensor IIOT device 120 will no longer communicate with the certain global computing server. Processing advances to 620.

Processing at 620 is perpetual unless the selected smart sensor IIOT device 120 is reset. The reset can be manual, programmatic, or performed in another way. The smart sensor IIOT device 120 takes direction via a user inputting properly formatted instructions through the console. Additionally, or alternatively, the smart sensor IIOT device 120 provides status information. Processing at 620 does not end.

Having now set forth certain embodiments, further clarification of certain terms used herein may be helpful to providing a more complete understanding of that which is considered inventive in the present disclosure.

Internet of Things (IOT) and Industrial Internet of Things (IIOT) devices are fixed and/or mobile electronic computing devices that are coupled or coupleable to a computing network. IOT devices are often described as devices with consumer facing applicability and IIOT devices are often described as devices with industrial or machine-to-machine applicability. The two types of devices (i.e., IOT and IIOT devices) have one or more computing processors, memory storing instructions that direct operations of the one or more computing processors, and network circuitry. In many cases, the IOT and IIOT devices also include a power source (e.g., one or more of a battery, a physical power interface, a power supply, a photovoltaic cell, an induction coil, etc.), at least one sensor (e.g., accelerometer, photo sensor, thermometer, and many others), and memory to store data collected by the device.

The present disclosure will use the term IIOT devices, but it is recognized that the principles described herein are equally applicable to IOT devices.

Rather than a general-purpose computing device, an IIOT device is typically arranged to perform a particular function or set of functions. An IIOT device may, for example, be arranged as an environmental sensor that collects data such as temperature, humidity, air quality, and the like. In these cases, the IIOT device is deployed in a city, rural area, or some other location, and the device is either programmed on site or at the factory to communicate with a specific remote computing server. The remote computing server may be arranged at a great distance (e.g., tens, hundreds, or even thousands of miles away) from the IIOT device. Alternatively, the remote computing server may be a smart phone tablet, or other computing device permanently or transitorily arranged a short distance (e.g., tens or hundreds of feet or inches or some other distance) from the IIOT device. In these cases, the IIOT device is programmed to communicate data to, from, or to and from a specific remote computing server.

Mobile network operators (MNOs) provide wireless cellular-based services in accordance with one or more cellular-based technologies. As used in the present disclosure, "cellular-based" should be interpreted in a broad sense to include any of the variety of technologies that implement wireless or mobile communications. Exemplary cellular-based systems include, but are not limited to, time division multiple access ("TDMA") systems, code division multiple access ("CDMA") systems, and Global System for Mobile communications ("GSM") systems. Some others of these technologies are conventionally referred to as UMTS, WCDMA, 4G, 5G, 6G, and LTE. Still other cellular-based technologies are also known now or will be known in the future. The underlying cellular-based technologies are mentioned here for a clearer understanding of the present disclosure, but the inventive aspects discussed herein are not limited to any particular cellular-based technology.

In some cases, cellular-based voice traffic is treated as digital data. In such cases, the term "voice-over-Internet-Protocol", or "VoIP," may be used to mean any type of voice service that is provided over a data network, such as an Internet Protocol (IP) based network. The term VoIP is interpreted broadly to include any system wherein a voice signal from a mobile computing device is represented as a digital signal that travels over a data network. VoIP then may also include any system wherein a digital signal from a data network is delivered to a mobile computing device where it is later delivered as an audio signal.

Standardized powerline interface connector devices of the types described herein are in at least some cases referred to as NEMA devices, NEMA compatible devices, NEMA compliant devices, or the like. And these devices include receptacles, connectors, sockets, holders, components, etc. Hence, as used in the present disclosure and elsewhere, those of skill in the art will recognize that coupling the term "NEMA" or the term "ANSI" with any such device indicates a device or structure compliant with a standard promoted by a standards body such as NEMA, ANSI, IEEE, or the like.

A mobile device, or mobile computing device, is an electronic device provisioned by at least one mobile network operator (MNO) to communicate data through the MNO's cellular-based network. The data may be voice data, short message service (SMS) data, electronic mail, world-wide web or other information conventionally referred to as "internet traffic," or any other type of electromagnetically communicable information. The data may be digital data or analog data. The data may be packetized or non-packetized. The data may be formed or passed at a particular priority level, or the data may have no assigned priority level at all. A non-comprehensive, non-limiting list of mobile devices is provided to aid in understanding the bounds of the term, "mobile device," as used herein. Mobile devices (i.e., mobile computing devices) include cell phones, smart phones, flip phone, tablets, phablets, handheld computers, laptop computers, body-worn computers, and the like. Certain other electronic equipment, such as IOT devices, IIOT devices, smart devices, and other like computing devices in any form factor, may also be referred to as a mobile device when this equipment is provisioned for cellular-based communication on an MNO's cellular-based network. Examples of this other electronic equipment include in-vehicle devices, medical devices, industrial equipment, retail sales equipment, wholesale sales equipment, utility monitoring equipment, streetlight controllers, small cells, transformer monitors, any type of "smart-city" devices, and other such equipment used by private, public, government, and other entities.

Mobile devices further have a collection of input/output ports for passing data over short distances to and from the mobile device. For example, serial ports, USB ports, WiFi ports, Bluetooth ports, IEEE 1394 FireWire, and the like can communicatively couple the mobile device to other computing apparatuses.

Mobile devices have a battery or other power source, and they may or may not have a display. In many mobile devices, a signal strength indicator is prominently positioned on the display to provide network communication connectivity information to the mobile device user.

A cellular transceiver is used to couple the mobile device to other communication devices through the cellular-based communication network. In some cases, software and data in a file system are communicated between the mobile device and a computing server via the cellular transceiver. That is, bidirectional communication between a mobile device and a global or local computing server is facilitated by the cellular transceiver. For example, a computing server may download a new or updated version of software to the mobile device over the cellular-based communication network. As another example, the mobile device may communicate any other data to the computing server over the cellular-based communication network.

Each mobile device client has electronic memory accessible by at least one processing unit within the device. The memory is programmed with software that directs the one or more processing units. Some of the software modules in the memory control the operation of the mobile device with respect to generation, collection, and distribution or other use of data. In some cases, software directs the collection of individual datums, and in other cases, software directs the collection of sets of data.

FIGS. 5 and 6 include data flow diagrams illustrating non-limiting processes that may be used by embodiments of an IIOT device provisioning system. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted.

The figures in the present disclosure illustrate portions of one or more non-limiting computing devices embodiments such as one or more of smart sensor IIOT devices 120 and computing servers 250, 250a, 250b, 550c, and 550f. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments of industrial internet of things (IIOT) devices that include or otherwise cooperate with one or more computing devices. It is recognized that these IIOT devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, IIOT devices have one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, a CD-ROM, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The IIOT devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the IIOT device is a single hardware machine having at least some of the hardware and software listed herein, and in other cases, the IIOT device embodiments are a networked collection of hardware and software machines working together cooperatively in a server farm, cluster, cloud, or other networked environment to execute the functions of one or more embodiments described herein. Some aspects of the conventional hardware and software of the particular computing device are not shown in the figures for simplicity.

Amongst other things, the exemplary computing devices of the present disclosure (e.g., computing servers 250, 250*a*, 250*b*, 550*c*, and 550*f* of FIGS. 3-5) may be configured in any type of mobile or stationary computing device such as a remote cloud computer, a computing server, a smartphone, a tablet, a laptop computer, a wearable device (e.g., eyeglasses, jacket, shirt, pants, socks, shoes, other clothing, hat, helmet, other headwear, wristwatch, bracelet, pendant, other jewelry), vehicle-mounted device (e.g., train, plane, helicopter, unmanned aerial vehicle, unmanned underwater vehicle, unmanned land-based vehicle, automobile, motorcycle, bicycle, scooter, hover-board, other personal or commercial transportation device), industrial device (e.g., factory robotic device, home-use robotic device, retail robotic device, office-environment robotic device), or the like. Accordingly, the computing devices include other components and circuitry that is not illustrated, such as, for example, a display, a network interface, memory, one or more central processors, camera interfaces, audio interfaces, and other input/output interfaces. In some cases, the exemplary computing devices may also be configured in a different type of low-power device such as a mounted video camera, an Internet-of-Things (IoT) device, a multimedia device, a motion detection device, an intruder detection device, a security device, a crowd monitoring device, or some other device.

When so arranged as described herein, each IIOT device may be transformed from a generic and unspecific computing device to a combination device arranged comprising hardware and software configured for a specific and particular purpose such as to provide a determined technical solution. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of IIOT and other processor-based "smart" devices, but other techniques and tools remain available to provision said IIOT devices and other smart devices. Therefore, the claimed subject matter does not foreclose the whole or even substantial IIOT and other like provisioning technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific provisioning that lets any suitable number (e.g., tens, hundreds, thousands, millions, or some other number) of processor-based smart devices (e.g., an IOT device, an IIOT device, or other like smart device) be programmed to a same default state, deployed in a disparate geographic area, and then automatically be provisioned after deployment to a final customized state as taught herein. The embodiments described in the present disclosure improve upon known provisioning processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform IIOT and other smart computing device provisioning operations.

Software may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Repositories (e.g., database structures), if any are present in the IIOT and other computing systems described herein, may be formed in a single repository or multiple repositories. In some cases hardware or software storage repositories are shared amongst various functions of the particular system or systems to which they are associated. A repository (e.g., database) may be formed as part of a local system or local area network. Alternatively, or in addition, a repository may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the smart sensor IIOT devices 120 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the smart sensor IIOT devices 120 and computing servers 250, 250a, 250b, 550c, and 550f. The computing instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of an IIOT device or some other computing system.

Buttons, keypads, computer mice, memory cards, serial ports, bio-sensor readers, touch screens, and the like may individually or in cooperation be useful to a technician operating an IIOT device or other computing system. The devices may, for example, input control information into the system. Displays, printers, memory cards, LED indicators, temperature sensors, audio devices (e.g., speakers, piezo device, etc.), vibrators, and the like are all useful to present output information to the technician operating the IIOT device or other computing system. In some cases, the input and output devices are directly coupled to the smart sensor IIOT devices 120 and computing servers 250, 250a, 250b, 550c, and 550f and electronically coupled to a processor or other operative circuitry. In other cases, the input and output devices pass information via one or more communication ports (e.g., RS-232, RS-485, infrared, USB, etc.).

As described herein, for simplicity, a technician may in some cases be described in the context of the male gender. It is understood that a technician can be of any gender, and the terms "he," "his," and the like as used herein are to be interpreted broadly inclusive of all known gender definitions. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., inputting system-wide unique identifiers (SWUI'S) of a plurality of IOT devices, IIOT devices, or other smart computing devices, inputting batch ID's, receiving information from the particular computing device, and the like). An example of an activity that is not real-time is one that occurs over an extended period of time (e.g., days, months, or years for a single instance) or that occurs based on intervention or direction by a technician or other activity.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially horizontal," In these cases, a device that is mounted exactly horizontal is mounted along an "X" axis and a "Y" axis that is normal (i.e., 90 degrees or at right angle) to a plane or line formed by a "Z" axis. Different from the exact precision of the term, "horizontal," and the use of "substantially" or "about" to modify the characteristic permits a variance of the particular characteristic by up to 30 percent. As another example, a small cell networking device having a particular linear dimension of between about six (6) inches and twelve (12) inches includes such devices in which the linear dimension varies by up to 30 percent. Accordingly, the particular linear dimension of the small cell networking device may be between 2.4 inches and 15.6 inches.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The use of the phrase "set" (e.g., "a set of items") or "subset," unless otherwise noted or contradicted by context, is to be construed as a nonempty collection comprising one or more members.

The headings and Abstract of the Disclosure provided herein are for convenience only and do not interpret the scope or meaning of the embodiments. The industrial internet of things (IIOT) provisioning systems described in the present disclosure provide several technical effects and advances to the field of deploying IIOT devices on a large scale (e.g., hundreds, thousands, millions of devices).

Technical effects and benefits include the ability to mass produce the IIOT devices such that each device is generally identical except for a system-wide unique identifier (SWUI). The mass-produced IIOT devices are arranged to communicate with a certain global computing server when they are operating in an initial default state. In cooperation with packaging the IIOT devices for shipment from a factory, the SWUI of each device is captured and associated with a certain customer (e.g., via a purchase order). The IIOT devices can then be shipped, and the customer can install them without restriction. Upon installation, each IIOT device will communicate with the certain global computing server, which will use the SWUI received with the communication to look up customer information that the particular IIOT device is associated with. A fully qualified domain name (FQDN) addressing a customer-based computing server, or information to produce the FQDN, is transmitted by the certain global computing server to the respective IIOT device that initiated the communication, and from that point forward, the respective IIOT device will communicate with the customer-based computing server.

The device, method, and system embodiments described in this disclosure (i.e., the teachings of this disclosure) enable Internet of Things (IOT) and Industrial Internet of Things (IIOT) devices to be factory-programmed, or otherwise pre-deployment programmed, with one or more network communication parameters. The network communication parameters identify a first, global remote computing server by, for example, the network identity of the remote computing server. When the IOT or IIOT device is deployed and powered, the device will first communicate with the global remote computing server. In this first communication, the IOT or IIOT device will include identification information that enables the global remote computing server to know which IOT or IIOT device is communicating.

After receiving the identification information, the global remote computing server will determine a customer to which the IOT or IIOT device is assigned, and the global remote computing server will reply with a secondary set of network communication parameters, which the IOT or IIOT device will store in its memory. The secondary set of network communication parameters permits the IOT or IIOT device to direct future communications to a secondary (e.g., local) computing server. The secondary computing server manages a network of IOT or IIOT devices.

In at least one example, a plurality of hundreds of IIOT devices are sold to a particular city. In this case, the IIOT devices are streetlight controllers, and each of the hundreds of streetlight controllers, along with thousands, tens of thousands, hundreds of thousands, or some other number of streetlight controllers are programmed at a factory with identical network communication parameters. When any of the hundreds, thousands, or millions of streetlight controllers are deployed, the streetlight controller will first communicate with a same global remote computing server. In this first communication, based on a system-wide unique identifier of the particular streetlight controller, the global remote computing server will determine which customer (e.g., city, power utility, department of transportation, or the like) the streetlight controller belongs to. Next, the global remote computing server will return a network address of a customer-based computing server that the streetlight controller should communicate with. In the example, this process is carried out by the city's hundreds of streetlight controllers, and each of those streetlight controllers will reprogram itself with the new network address. In this way, the city's customer-based computing server will be able to manage the hundreds of streetlight controllers, for example, by displaying a map, overlaying a location of each streetlight controller on the map, and populating the map or other such content with information about each streetlight or its associated streetlight controller.

The present disclosure sets forth details of various structural embodiments that may be arranged to carry the teaching of the present disclosure. By taking advantage of the flexible circuitry, mechanical structures, computing architecture, and communications means described herein, a number of exemplary devices and systems are now disclosed.

The various embodiments described above can be combined to provide further embodiments. Various features of the embodiments are optional, and, features of one embodiment may be suitably combined with other embodiments. Aspects of the embodiments can be modified, if necessary to employ concepts of the various patents, application and publications to provide yet further embodiments.

Example A-1 teaches a method to provision a plurality of industrial internet of things (IIOT) devices. The method comprises: grouping a subset of the plurality of IIOT devices into a batch of IIOT devices, the plurality of IIOT devices arranged for deployment in disparate geographic locations, each of the plurality of IIOT devices having stored therein a system-wide unique identifier (SWUI) and first communication information identifying a certain global computing server; recording with a first input system the SWUI of each IIOT device in the batch; generating a batch identifier; associating the generated batch identifier with either or both of the batch of IIOT devices and each IIOT device in the batch of IIOT devices; associating the generated batch identifier with customer information, the customer information being associated with second communication information that identifies a customer-based computing server; receiving, at the certain global computing server, incoming communications from a selected IIOT device of the batch of IIOT devices, the incoming communications including the SWUI of the selected IIOT device; based on the SWUI, retrieving the batch identifier; and based on the batch identifier, transmitting second communication information that identifies the customer-based computing server to the selected IIOT device.

Example A-2 may include the subject matter of Example A-1, and alternatively or additionally any other example herein, wherein the method further comprises receiving, at the certain customer-based computing server, communications from the selected IIOT device; and based on the communications from the selected IIOT device, producing information for a network-based display of geographic information.

Example A-3 may include the subject matter of any of Examples A-1 to A-2, and alternatively or additionally any other example herein, wherein the method further comprises generating, with a web server, at least one web page arranged to present a map and at least one icon presented on the map, the at least one icon presented on the map representing a geographic location of the selected IIOT device.

Example A-4 may include the subject matter of any of Examples A-1 to A-3, and alternatively or additionally any other example herein, wherein at least some of the plurality of IIOT devices are streetlight control devices.

Example A-5 may include the subject matter of any of Examples A-1 to A-4, and alternatively or additionally any other example herein, wherein the certain global computing server is any one of a plurality of certain customer-based computing servers.

Example A-6 may include the subject matter of any of Examples A-1 to A-5, and alternatively or additionally any other example herein, wherein the batch of IIOT devices are co-located in a single shipping package prior to shipment to a customer, and wherein a representation of the batch identifier is a machine-readable structure affixed to the single shipping package.

Example A-7 may include the subject matter of any of Examples A-1 to A-6, and alternatively or additionally any other example herein, wherein the streetlight control device is arranged for coupling to a streetlight luminaire via a standardized powerline interface.

Example A-8 may include the subject matter of any of Examples A-1 to A-7, and alternatively or additionally any other example herein, wherein the standardized powerline interface is compliant with ANSI C136.41.

Example A-9 may include the subject matter of any of Examples A-1 to A-8, and alternatively or additionally any other example herein, wherein at least some of the plurality of IIOT devices are transformer-monitor devices.

Example A-10 may include the subject matter of any of Examples A-1 to A-9, and alternatively or additionally any other example herein, wherein at least some of the plurality of IIOT devices are utility power monitoring devices.

Example A-11 may include the subject matter of any of Examples A-1 to A-10, and alternatively or additionally any other example herein, wherein at least some of the plurality of IIOT devices are small-cell telecommunications devices.

Example A-12 may include the subject matter of any of Examples A-1 to A-11, and alternatively or additionally any other example herein, wherein at least some of the plurality of IIOT devices are arranged to communicate via radio frequency (RF) communications.

Example A-13 may include the subject matter of any of Examples A-1 to A-12, and alternatively or additionally any other example herein, wherein at least some of the plurality of IIOT devices are arranged to communicate via a cellular communications network.

Example A-14 may include the subject matter of any of Examples A-1 to A-13, and alternatively or additionally any other example herein, wherein the disparate geographic locations include a plurality of streetlights in a city.

Example A-15 may include the subject matter of any of Examples A-1 to A-14, and alternatively or additionally any other example herein, wherein the disparate geographic locations include a plurality of utility power poles.

Example A-16 may include the subject matter of any of Examples A-1 to A-15, and alternatively or additionally any other example herein, wherein the disparate geographic locations include a plurality of transformer cabinets.

Example A-17 may include the subject matter of any of Examples A-1 to A-16, and alternatively or additionally any other example herein, wherein the SWUI includes a media access control (MAC) address of a corresponding IIOT device.

Example A-18 may include the subject matter of any of Examples A-1 to A-17, and alternatively or additionally any other example herein, wherein the SWUI includes at least a portion of a cellular chipset identifier of a corresponding IIOT device.

Example A-19 may include the subject matter of any of Examples A-1 to A-18, and alternatively or additionally any other example herein, wherein the SWUI includes a serial number.

Example A-20 may include the subject matter of any of Examples A-1 to A-19, and alternatively or additionally any other example herein, wherein the SWUI includes at least 24 binary bits.

Example A-21 may include the subject matter of any of Examples A-1 to A-20, and alternatively or additionally any other example herein, wherein the first communication information includes a fixed network address.

Example A-22 may include the subject matter of any of Examples A-1 to A-21, and alternatively or additionally any other example herein, wherein the first communication information includes a website address.

Example A-23 may include the subject matter of any of Examples A-1 to A-22, and alternatively or additionally any other example herein, wherein the first communication information includes a unique identifier associated with the certain global computing server.

Example A-24 may include the subject matter of any of Examples A-1 to A-23, and alternatively or additionally any other example herein, wherein the first communication information is a telephone number.

Example A-25 may include the subject matter of any of Examples A-1 to A-24, and alternatively or additionally any other example herein, wherein the first communication information includes cellular connectivity information.

Example A-26 may include the subject matter of any of Examples A-1 to A-25, and alternatively or additionally any other example herein, wherein the certain global computing server is arranged to communicate via a Message Queueing (MQ) Telemetry Transport (MQTT) protocol.

Example A-27 may include the subject matter of any of Examples A-1 to A-26, and alternatively or additionally any other example herein, wherein the certain global computing server is configured at a fixed network address.

Example A-28 may include the subject matter of any of Examples A-1 to A-27, and alternatively or additionally any other example herein, wherein the fixed network address is an internet address.

Example A-29 may include the subject matter of any of Examples A-1 to A-28, and alternatively or additionally any other example herein, wherein the fixed network address is an internet address that conforms to an IPv6 protocol.

Example A-30 may include the subject matter of any of Examples A-1 to A-29, and alternatively or additionally any other example herein, wherein the fixed network address is an internet address that is compatible with an IPv4 protocol and an IPv6 protocol.

Example A-31 may include the subject matter of any of Examples A-1 to A-30, and alternatively or additionally any other example herein, wherein the certain global computing server is arranged as a web server.

Example A-32 may include the subject matter of any of Examples A-1 to A-31, and alternatively or additionally any other example herein, wherein the first input system is a handheld system.

Example A-33 may include the subject matter of any of Examples A-1 to A-32, and alternatively or additionally any other example herein, wherein the first input system is an automated system arranged to electronically capture a machine-readable code.

Example A-34 may include the subject matter of any of Examples A-1 to A-33, and alternatively or additionally any other example herein, wherein the first input system is integrated with a package handling system.

Example A-35 may include the subject matter of any of Examples A-1 to A-34, and alternatively or additionally any other example herein, wherein the first input system is arranged to electronically capture a machine-readable code from a label affixed to one of the IIOT devices of the plurality of IIOT devices.

Example A-36 may include the subject matter of any of Examples A-1 to A-35, and alternatively or additionally any other example herein, wherein the first input system is arranged to electronically capture a machine-readable code from a label prior to the label being affixed to one of the IIOT devices of the plurality of IIOT devices.

Example A-37 may include the subject matter of any of Examples A-1 to A-36, and alternatively or additionally any other example herein, wherein the first input system is arranged to record a serial number.

Example A-38 may include the subject matter of any of Examples A-1 to A-37, and alternatively or additionally any other example herein, wherein the first input system is arranged to store the SWUI in a product data repository.

Example A-39 may include the subject matter of any of Examples A-1 to A-38, and alternatively or additionally any other example herein, wherein the second input system is a handheld system.

Example A-40 may include the subject matter of any of Examples A-1 to A-39, and alternatively or additionally any other example herein, wherein the second input system is an automated system arranged to electronically capture a machine-readable code.

Example A-41 may include the subject matter of any of Examples A-1 to A-40, and alternatively or additionally any other example herein, wherein the second input system is integrated with a package handling system.

Example A-42 may include the subject matter of any of Examples A-1 to A-41, and alternatively or additionally any other example herein, wherein the second input system is arranged to electronically capture a machine-readable code from a shipping package.

Example A-43 may include the subject matter of any of Examples A-1 to A-42, and alternatively or additionally any other example herein, wherein the second input system is arranged to store the batch identifier in a batch data repository, wherein each SWUI is associated with at least one batch identifier.

Example A-44 may include the subject matter of any of Examples A-1 to A-43, and alternatively or additionally any other example herein, wherein the second input system is arranged to generate the batch identifier.

Example A-45 may include the subject matter of any of Examples A-1 to A-44, and alternatively or additionally any other example herein, wherein each batch identifier is electronically associated with a purchase order.

Example A-46 may include the subject matter of any of Examples A-1 to A-45, and alternatively or additionally any other example herein, wherein each batch identifier identifies a single box of IIOT devices.

Example A-47 may include the subject matter of any of Examples A-1 to A-46, and alternatively or additionally any other example herein, wherein each batch identifier identifies a shippable package of IIOT devices.

Example A-48 may include the subject matter of any of Examples A-1 to A-47, and alternatively or additionally any other example herein, wherein each batch identifier identifies a pallet-load of IIOT devices.

Example A-49 may include the subject matter of any of Examples A-1 to A-46, and alternatively or additionally any other example herein, wherein each batch identifier identifies a plurality of shippable packages of IIOT devices.

Example A-50 may include the subject matter of any of Examples A-1 to A-49, and alternatively or additionally any other example herein, wherein each batch identifier is a randomly generated number.

Example A-51 may include the subject matter of any of Examples A-1 to A-49, and alternatively or additionally any other example herein, wherein each batch identifier is a number in a sequence of numbers.

Example A-52 may include the subject matter of any of Examples A-51 to A-41, and alternatively or additionally any other example herein, wherein each batch identifier represents a subset of the plurality of IIOT devices.

Example A-53 may include the subject matter of any of Examples A-1 to A-52, and alternatively or additionally any other example herein, wherein the plurality of IIOT devices are grouped into a plurality of subsets, each subset having a system-wide subset identifier (SWSI).

Example A-54 may include the subject matter of any of Examples A-1 to A-53, and alternatively or additionally any other example herein, wherein the SWSI is a barcode, a QR code, or an RFID.

Example A-55 may include the subject matter of any of Examples A-1 to A-54, and alternatively or additionally any other example herein, wherein a representation of the SWSI is accessible in proximity to the shipping package.

Example A-56 may include the subject matter of any of Examples A-1 to A-55, and alternatively or additionally any other example herein, wherein communications from each of the plurality of IIOT devices are encrypted.

Example A-57 may include the subject matter of any of Examples A-1 to A-56, and alternatively or additionally any other example herein, wherein communications from each of the plurality of IIOT devices are compressed.

Example A-58 may include the subject matter of any of Examples A-1 to A-57, and alternatively or additionally any other example herein, wherein communications from each of the plurality of IIOT devices are scheduled.

Example A-59 may include the subject matter of any of Examples A-1 to A-58, and alternatively or additionally any other example herein, wherein communications from each of the plurality of IIOT devices include fewer than 500 bytes of information per packet.

Example A-60 may include the subject matter of any of Examples A-1 to A-59, and alternatively or additionally any other example herein, wherein the size of each packet communicated from each of the plurality of IIOT devices is less than 1024 bytes.

Example A-61 may include the subject matter of any of Examples A-1 to A-59, and alternatively or additionally any other example herein, wherein communications from each of the plurality of IIOT devices include wireless communications, wired communications, or both wired and wireless communications.

Example A-62 may include the subject matter of any of Examples A-1 to A-61, and alternatively or additionally any other example herein, wherein the certain global computing server is arranged to retrieve the second communication information from a repository that stores the batch identifier, the SWUI, and customer information.

Example A-63 may include the subject matter of any of Examples A-1 to A-62, and alternatively or additionally any other example herein, wherein the certain global computing server is arranged to isolate certain customer information with the batch identifier and the SWUI.

Example A-64 may include the subject matter of any of Examples A-1 to A-63, and alternatively or additionally any other example herein, wherein the customer information includes the second communication information.

Example A-65 may include the subject matter of any of Examples A-1 to A-64, and alternatively or additionally any other example herein, wherein the customer information is associated with a certain city.

Example A-66 may include the subject matter of any of Examples A-1 to A-65, and alternatively or additionally any other example herein, wherein the customer information is associated with a power utility.

Example A-67 may include the subject matter of any of Examples A-1 to A-66, and alternatively or additionally any other example herein, wherein the customer information is associated with an operator of a plurality of streetlights.

Example A-68 may include the subject matter of any of Examples A-1 to A-67, and alternatively or additionally any other example herein, wherein the customer information is associated with an operator of a plurality of utility poles.

Example A-69 may include the subject matter of any of Examples A-1 to A-68, and alternatively or additionally any other example herein, wherein the customer information is associated with a plurality of batch identifiers.

Example A-70 may include the subject matter of any of Examples A-1 to A-69, and alternatively or additionally any other example herein, wherein the customer information is a second system-wide unique identifier.

Example A-71 may include the subject matter of any of Examples A-1 to A-70, and alternatively or additionally any other example herein, wherein the second communication information includes a fixed network address of the certain customer-based computing server.

Example A-72 may include the subject matter of any of Examples A-1 to A-71, and alternatively or additionally any other example herein, wherein the second communication information includes a website address associated with the certain customer-based computing server.

Example A-73 may include the subject matter of any of Examples A-1 to A-72, and alternatively or additionally any other example herein, wherein the second communication information includes a unique identifier associated with the certain customer-based computing server.

Example A-75 may include the subject matter of any of Examples A-1 to A-74, and alternatively or additionally any other example herein, wherein the second communication information is a telephone number.

Example A-76 may include the subject matter of any of Examples A-1 to A-75, and alternatively or additionally any other example herein, wherein the second communication information includes cellular connectivity information.

Example A-77 may include the subject matter of any of Examples A-1 to A-76, and alternatively or additionally any other example herein, wherein the certain global computing server and the certain customer-based computing server are a same server.

Example A-78 may include the subject matter of any of Examples A-1 to A-77, and alternatively or additionally any other example herein, wherein the customer-based computing server is arranged as a web server.

Example A-79 may include the subject matter of any of Examples A-1 to A-78, and alternatively or additionally any other example herein, wherein the customer-based computing server is arranged to present at least one web page, the at least one web page presenting a map and at least one icon, the at least one icon representing a geographic location of the selected IIOT device.

Example A-80 may include the subject matter of any of Examples A-1 to A-79, and alternatively or additionally any other example herein, wherein the customer-based computing server is arranged to present service information associated with the selected IIOT device.

Example A-81 may include the subject matter of any of Examples A-1 to A-80, and alternatively or additionally any other example herein, wherein the customer-based computing server is arranged to present location information associated with the selected IIOT device.

Example A-82 may include the subject matter of any of Examples A-1 to A-81, and alternatively or additionally any other example herein, wherein the customer-based computing server is arranged to present streetlight information associated with the selected IIOT device.

Example A-83 may include the subject matter of any of Examples A-1 to A-82, and alternatively or additionally any other example herein, wherein the customer-based computing server is arranged to present sensor information collected by the selected IIOT device.

Example A-84 may include the subject matter of any of Examples A-1 to A-83, and alternatively or additionally any other example herein, wherein the customer-based computing server is arranged to present video information associated with the selected IIOT device.

Example A-85 may include the subject matter of any of Examples A-1 to A-84, and alternatively or additionally any other example herein, wherein the customer-based computing server is arranged to present audio information associated with the selected IIOT device.

Example A-86 may include the subject matter of any of Examples A-1 to A-85, and alternatively or additionally any other example herein, wherein the customer-based computing server is arranged to present multimedia information associated with the selected IIOT device.

Example A-87 may include the subject matter of any of Examples A-1 to A-86, and alternatively or additionally any other example herein, wherein the customer-based computing server is arranged to present environmental information associated with the selected IIOT device, said environmental information including at least one of temperature, pressure, humidity, air quality, and wind speed.

Example A-88 may include the subject matter of any of Examples A-1 to A-87, and alternatively or additionally any other example herein, wherein the customer-based computing server is arranged to present information associated with at least one person in proximity of the selected IIOT device, wherein proximity is a distance less than 1000 feet, a distance less than 500 feet, a distance less than 250 feet, or a distance less than 50 feet.

Example A-89 may include the subject matter of any of Examples A-1 to A-88, and alternatively or additionally any other example herein, wherein the customer-based computing server is arranged to present information representing a count of persons in proximity to the selected IIOT device.

Example A-90 may include the subject matter of any of Examples A-1 to A-89, and alternatively or additionally any other example herein, wherein the customer-based computing server is arranged to present information representing a count of vehicles in proximity to the selected IIOT device.

Example A-91 may include the subject matter of any of Examples A-1 to A-90, and alternatively or additionally any other example herein, wherein the customer-based computing server is arranged to present information representing at least one city-scape feature associated with the selected IIOT device, wherein said at least one city-scape feature includes at least one of a count of parking spots, parked vehicles, potholes, collected refuse, public transit, animal activity, and emergency vehicle presence.

Example A-92 may include the subject matter of any of Examples A-1 to A-91, and alternatively or additionally any other example herein, wherein the network-based display includes a representation of a map and a plurality of icons, wherein each of the plurality of icons represents a different IIOT device.

Example B-1 is a system to provision a plurality of industrial internet of things (IIOT) devices, comprising: a first input system to record a system-wide unique identifier (SWUI) of each IIOT device of a plurality of IIOT devices, the plurality of IIOT devices configured for deployment in disparate geographic locations, each of the plurality of IIOT devices having stored therein the SWUI and first communication information that identifies a certain global computing server; a second input system to associate a batch identifier with a batch of IIOT devices and to further associate the batch identifier with the SWUI of each IIOT device in the batch of IIOT devices, said batch of IIOT devices being a subset of the plurality of IIOT device; the certain global computing server is arranged, for each IIOT device of the batch of IIOT devices, to: receive incoming communications from a selected IIOT device of the batch of IIOT devices; based on the SWUI, retrieve the batch identifier associated with the selected IIOT device; and based on the batch identifier, transmit, to the selected IIOT device, second communication information that identifies a certain customer-based computing server. The customer-based computing server is arranged to: receive communications from the selected IIOT device; and produce information for a network-based display of geographic information.

Example C-1 is a method, comprising: retrieving at a first computing server a separate and distinct system-wide unique ID (SWUI) for each of N industrial internet of things (IIOT) devices, wherein N is a first integer greater than zero; generating at the first computing server a shipment code that includes information sufficient to determine each of the N separate and distinct SWUI's; joining a representation of the shipment code to a shippable package, the shippable package containing the N IIOT devices; receiving at a second computing server a purchase order (PO); assigning a unique purchase order code (POCode) to the PO; associating at the second computing server SWUI's of M shippable packages with the POCode; storing by the second computing server the associated SWUI's and POCode in a repository; receiving at a third computing server a certain SWUI via a network connection; and pointing an IIOT device associated with the certain SWUI to a fourth computing server based on the SWUI.

Example C-2 may include the subject matter of Example C-1, and alternatively or additionally any other example herein, wherein all of the first, second, third, and fourth computing servers are different computing servers.

Example D-1 is a non-transitory computer-readable storage medium whose stored contents configure a computing system to perform a method, the method comprising: accepting a different batch identifier for each of M batches of industrial internet of things (IIOT) devices, each of the M batches including N IIOT devices, wherein M and N are integers greater than 0; storing the M batch identifiers in a repository; accepting a separate and distinct system-wide unique identifier (SWUI) for each of the N IIOT devices in each of the M batches; associating, in the repository, each of the N IIOT devices in a batch with its respective one of the M batch identifiers; receiving one or more purchase order (PO) identifiers, each PO identifier representing a customer purchase order for a plurality of IIOT devices; associating, in the repository, each PO identifier with at least one of the M batch identifiers; receiving information communicated from one or more IIOT devices that have been deployed, each instance of the received information including a received SWUI of an IIOT device that transmitted the information; based on the received SWUI, querying the repository to identify which of the M batch identifiers is associated with the received SWUI and to further identify which PO identifier and customer is associated with the received SWUI; and based on the querying, communicating network address information associated with the customer back to the IIOT device that transmitted the information.

Example D-2 may include the subject matter of Example D-1, and alternatively or additionally any other example herein, wherein the method further comprise: directing a video output module to output a decoded sequence of video frames to a display device.

Example D-3 may include the subject matter of any of Examples D-1 to D-2, and alternatively or additionally any other example herein, wherein the method further comprises: directing a video output module to output status information associated with each of the N IIOT devices.

Example E-1 is a method to provision industrial internet of things (IIOT) devices, comprising: retrieving a system-wide unique ID (SWUI) for each of N IIOT devices; generating a shipment code that includes information to determine each of the N SWUI's; joining the shipment code to a shippable package of IIOT devices; receiving a purchase order (PO); assigning a unique purchase order code (PO-Code) to the PO; associating SWUI's of M shippable packages of IIOT devices with the POCode; storing the associated SWUI's and POCode in a repository; receiving a SWUI via a network connection; and pointing the IIOT device to a selected computing server based on the SWUI.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Various devices that utilize the circuits and modules of the present disclosure are described in U.S. Patent Application No. 62/614,918, filed Jan. 8, 2018, which is incorporated herein by reference in its entirety to the fullest extent allowed by law.

Various devices that utilize the circuits and modules of the present disclosure are described in International Patent Application PCT/US2019/012775, filed Jan. 8, 2019, which is incorporated by reference in its entirety to the fullest extent allowed by law.

U.S. Provisional Patent Application No. 63/002,178, filed Mar. 30, 2020, is incorporated herein by reference, in its entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to provision a plurality of industrial internet of things (IIOT) devices, comprising:
grouping a subset of the plurality of IIOT devices into a batch of IIOT devices, the plurality of IIOT devices arranged for deployment in disparate geographic locations, each of the plurality of IIOT devices having stored therein a system-wide unique identifier (SWUI) and first communication information identifying a certain global computing server;
recording with a first input system the SWUI of each IIOT device in the batch;
generating a batch identifier;
associating the generated batch identifier with either or both of the batch of IIOT devices and each IIOT device in the batch of IIOT devices;
associating the generated batch identifier with customer information, the customer information being associated with second communication information that identifies a customer-based computing server;
receiving, at the certain global computing server, incoming communications from a selected IIOT device of the batch of IIOT devices, the incoming communications including the SWUI of the selected IIOT device;
based on the SWUI, retrieving the batch identifier; and
based on the batch identifier, transmitting second communication information that identifies the customer-based computing server to the selected IIOT device.

2. The method of claim 1, further comprising:
receiving, at the certain customer-based computing server, communications from the selected IIOT device; and
based on the communications from the selected IIOT device, producing information for a network-based display of geographic information.

3. The method of claim 1, further comprising:
generating, with a web server, at least one web page arranged to present a map and at least one icon presented on the map, the at least one icon presented on the map representing a geographic location of the selected IIOT device.

4. The method of claim 1 wherein at least some of the plurality of IIOT devices are smart streetlight controllers.

5. The method of claim 1 wherein at least some of the plurality of IIOT devices are transformer-monitor devices or small cell telecommunications devices.

6. The method of claim 1 wherein at least some of the plurality of IIOT devices are arranged to communicate via a cellular communications network.

7. The method of claim 1 wherein the SWUI includes at least a portion of a cellular chipset identifier.

8. The method of claim 1 wherein the certain global computing server is any one of a plurality of certain customer-based computing servers.

9. The method of claim 1 wherein the batch of IIOT devices are co-located in a single shipping package prior to shipment to a customer, and wherein a representation of the batch identifier is a machine-readable structure affixed to the single shipping package.

10. The method of claim 1 wherein each batch identifier is electronically associated with a purchase order.

11. The method of claim 1 wherein each batch identifier identifies a shippable package of IIOT devices.

12. The method of claim 1 wherein the customer-based computing server is arranged to present at least one web page, the at least one web page presenting a map and at least one icon, the at least one icon representing a geographic location of the selected IIOT device.

13. A system to provision a plurality of industrial internet of things (IIOT) devices, comprising:
a first input system to record a system-wide unique identifier (SWUI) of each IIOT device of a plurality of IIOT devices, the plurality of IIOT devices configured for deployment in disparate geographic locations, each of the plurality of IIOT devices having stored therein the SWUI and first communication information that identifies a certain global computing server;
a second input system to associate a batch identifier with a batch of IIOT devices and to further associate the batch identifier with the SWUI of each IIOT device in the batch of IIOT devices, said batch of IIOT devices being a subset of the plurality of IIOT device;
the certain global computing server arranged to:
receive incoming communications from a selected IIOT device of the batch of IIOT devices;
based on the SWUI, retrieve the batch identifier associated with the selected IIOT device; and
based on the batch identifier, transmit, to the selected IIOT device, second communication information that identifies a certain customer-based computing server; and
the certain customer-based computing server arranged to:
receive communications from the selected IIOT device; and
produce information for a network-based display of geographic information.

14. The system of claim 13 wherein the first input system and the second input system include at least one of a barcode reader, a quick response (QR) code reader, or a radio frequency identifier (RFID) reader.

15. The system of claim 13 wherein at least some of the plurality of IIOT devices are smart streetlight controllers, transformer-monitor devices, or small cell telecommunications devices.

16. The system of claim 13 wherein at least some of the plurality of IIOT devices are arranged to communicate via a cellular communications network.

17. The system of claim 13 wherein the certain global computing server and the certain customer-based computing server are different computing servers.

18. The system of claim 13 wherein each location of the disparate geographic locations is a different streetlight luminaire.

19. A method, comprising:
retrieving at a first computing server a separate and distinct system-wide unique ID (SWUI) for each of N industrial internet of things (IIOT) devices, wherein N is a first integer greater than zero;
generating at the first computing server a shipment code that includes information sufficient to determine each of the N separate and distinct SWUI's;
joining a representation of the shipment code to a shippable package, the shippable package containing the N IIOT devices;
receiving at a second computing server a purchase order;
assigning at the second computing server a unique purchase order code to the purchase order;
associating at the second computing server SWUI's of M shippable packages with the unique purchase order code, wherein M is a second integer greater than zero;
storing by the second computing server the associated SWUI's and unique purchase order code in a repository;
receiving at a third computing server a certain SWUI via a network connection; and
pointing an IIOT device associated with the certain SWUI to a fourth computing server based on the certain SWUI.

20. The method of claim 19 wherein all of the first, second, third, and fourth computing servers are different computing servers.

* * * * *